United States Patent
Ueguri

(10) Patent No.: US 9,692,979 B2
(45) Date of Patent: Jun. 27, 2017

(54) IMAGE PICKUP APPARATUS

(71) Applicant: CANON KABUSHIKI KAISHA, Tokyo (JP)

(72) Inventor: Toshiaki Ueguri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/007,410

(22) Filed: Jan. 27, 2016

(65) Prior Publication Data

US 2016/0227103 A1    Aug. 4, 2016

(30) Foreign Application Priority Data

Jan. 30, 2015    (JP) ................. 2015-017372

(51) Int. Cl.
*H04N 5/222*    (2006.01)
*H04N 5/232*    (2006.01)

(52) U.S. Cl.
CPC ..... *H04N 5/23293* (2013.01); *H04N 5/23212* (2013.01)

(58) Field of Classification Search
CPC ........... H04N 5/23293; H04N 5/23212; H04N 5/232; H04N 2201/3252
USPC .... 348/220.1, 222.1, 333.01–333.09, 333.11
See application file for complete search history.

(56) References Cited

U.S. PATENT DOCUMENTS

2004/0263533 A1*  12/2004  Yamamoto .............. G06T 11/60
                                                    345/619
2007/0024733 A1*  2/2007  Denpo ............... H04N 5/23293
                                                    348/333.1

FOREIGN PATENT DOCUMENTS

JP      4378141 B       12/2009
JP      2011-02848 A    1/2011

* cited by examiner

*Primary Examiner* — Yogesh Aggarwal
(74) *Attorney, Agent, or Firm* — Cowan, Liebowitz & Latman, P.C.

(57) ABSTRACT

An image pickup apparatus including a storage unit configured to store an adjustment value for adjusting a position at which a photographing lens stops during an automatic focusing operation performed with respect to an object; and a control unit, the control unit including a first mode for controlling so that when an image switching request has been received, before a switched image is displayed on a display unit, a thumbnail image corresponding to the switched image is displayed on the display unit; and a second mode for controlling so that when the image switching request has been received, the switched image is displayed on the display unit without displaying the thumbnail image, the control unit being configured to, in an operation state for selecting the adjustment value, control in the second mode so that the switched image is displayed on the display unit without the thumbnail image being displayed.

14 Claims, 18 Drawing Sheets

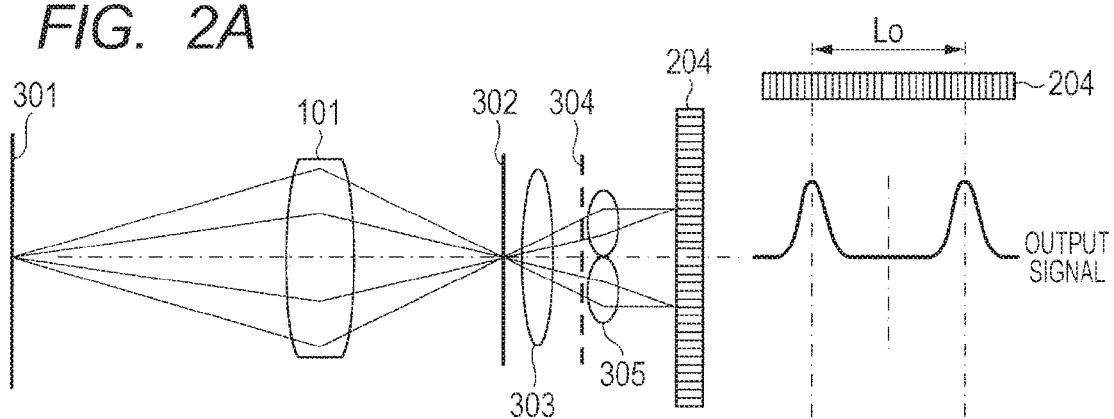
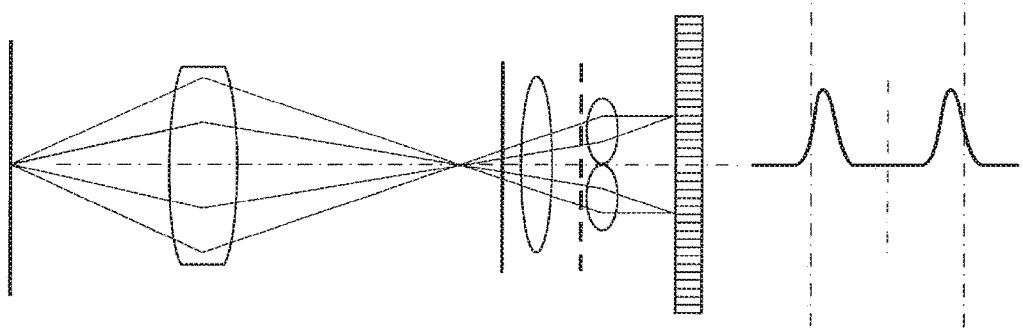
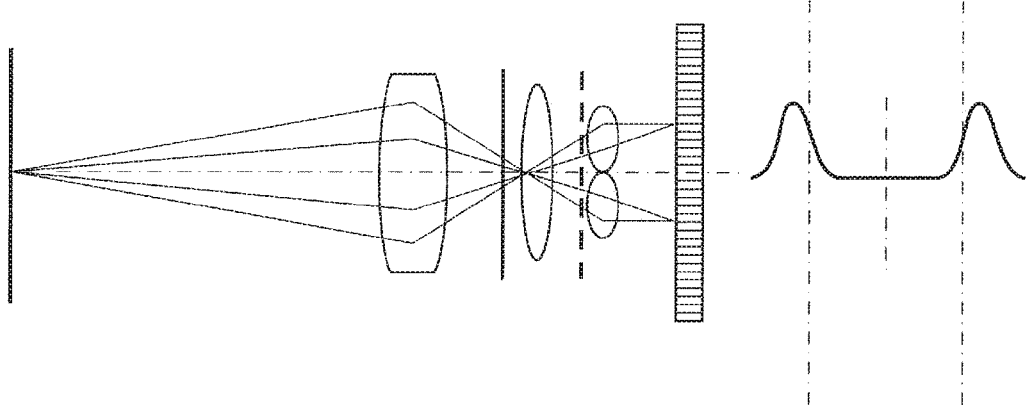

IMAGE PICKUP APPARATUS

BACKGROUND OF THE INVENTION

Field of the Invention

The present invention relates to an image pickup apparatus.

Description of the Related Art

Hitherto, in a single-lens reflex camera system in which lenses can be interchanged, in general, a through the lens (TTL) phase difference focus detection method is used. In the case of a single-lens reflex camera system, normally, a photographing lens is detachably mounted to a camera body. Because each photographing lens has a different level of manufacturing error, a focus position is different for each photographing lens.

In Japanese Patent No. 4378141, there is described a method of correcting the focus position by taking images while shifting the focus position by a small amount forward or backward from an auto focus (AF) focus position adjusted during manufacturing, selecting the photographed image that best matches the focus position desired by the user, and using that relative shifted amount as an AF correction value.

In Japanese Patent Application Laid-Open No. 2011-2848, there is described a method of correcting the focus position by taking images while shifting the focus position by a small amount forward or backward from an AF focus position adjusted during manufacturing for each lens, selecting the photographed image that best matches the focus position desired by the user, and using that relative shifted amount as an AF correction value. Further, in Japanese Patent Application Laid-Open No. 2011-2848, there is described a method of switching operation based on a selection state of a photography mode and a normal photography mode.

SUMMARY OF THE INVENTION

According to an aspect of the present invention, there is provided an image pickup apparatus, including a storage unit configured to store an adjustment value for adjusting a position at which a photographing lens stops during an automatic focusing operation performed with respect to an object, the adjustment value being selected by a user; and a control unit, the control unit including a first mode for controlling so that when an image switching request has been received, before a switched image is displayed on a display unit, a thumbnail image corresponding to the switched image is displayed on the display unit; and a second mode for controlling so that when the image switching request has been received, the switched image is displayed on the display unit without displaying the thumbnail image, the control unit being configured to, in an operation state for selecting the adjustment value, control in the second mode so that the switched image is displayed on the display unit without the thumbnail image being displayed.

Further features of the present invention will become apparent from the following description of exemplary embodiments with reference to the attached drawings.

BRIEF DESCRIPTION OF THE DRAWINGS

FIGS. 2A, 2B and 2C are diagrams for illustrating the principles of defocus amount detection.

DESCRIPTION OF THE EMBODIMENTS

Preferred embodiments of the present invention will now be described in detail in accordance with the accompanying drawings.

First Embodiment

An image pickup apparatus according to a first embodiment of the present invention is described with reference to the drawings.

The image pickup apparatus according to this embodiment is capable of performing micro adjustments to the focus.

Figure 1:
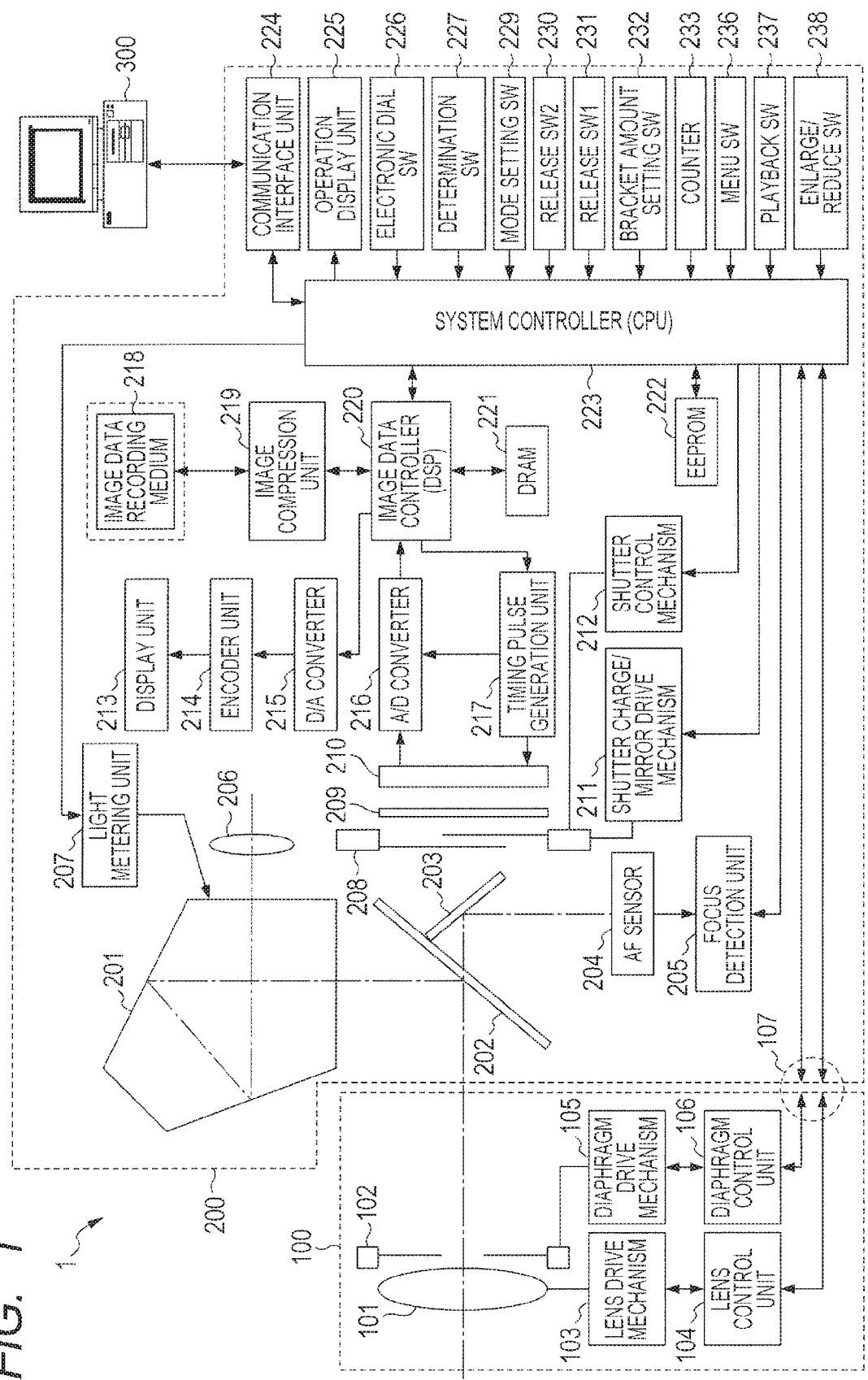
FIG. 1 is a block diagram of an image pickup apparatus according to a first embodiment of the present invention.

FIG. 1 is a block diagram for illustrating a configuration of an image pickup apparatus 1 according to this embodiment. The image pickup apparatus 1 is a digital camera, which includes a lens unit 100 and a camera body 200. The lens unit 100 includes an interchangeable photographing lens.

The lens unit 100 is detachably mounted to the camera body 200 via a mounting mechanism (not shown). The image pickup apparatus 1 includes an electrical contact group 107 on a mounting portion between the lens unit 100 and the camera body 200. The camera body 200 performs communication to and from the lens unit 100 via the electrical contact group 107, and controls a drive of a photographing lens 101 and a diaphragm 102.

A photography light flux from an object image (not shown) is guided to a quick return mirror 202 of the camera body 200 via the photographing lens 101 and the diaphragm 102, which is configured to adjust the light amount. The quick return mirror 202, which has a center portion that is a half mirror, is configured so that when the quick return mirror 202 is at a down position, a part of the object light flux passes through the quick return mirror 202.

The object light flux that has passed through the quick return mirror 202 is reflected by a sub-mirror 203 arranged to the rear of the quick return mirror 202, and guided to an AF sensor 204. On the other hand, the photography light flux reflected by the quick return mirror 202 travels to the photographer's eye via a pentaprism 201 and an eyepiece lens 206.

When the quick return mirror 202 is at an up position, the light flux from the photographing lens 101 travels to an image pickup element 210, which is represented by a complementary metal-oxide semiconductor (CMOS) sensor or the like, via a focal-plane shutter 208, which is a mechanical shutter, and a filter 209. Note that, the sub-mirror 203 is configured so as to be folded down when the quick return mirror 202 is at an up position.

The filter 209 has a function of cutting infrared light and guiding only visible light to the image pickup element 210, and a function as an optical low-pass filter configured to cut a high frequency component of the object light. The focal-plane shutter 208, which includes a front curtain and a rear curtain, is configured to control whether or not the light flux from the photographing lens 101 passes therethrough or is blocked.

The camera body 200 includes a system controller (control unit) 223 configured by a central processing unit (CPU), which serves as a control unit of the overall image pickup apparatus 1. The system controller 223 is configured to suitably control operation of each of the units that are described later based on various programs stored in an electrically erasable programmable read-only memory (EEPROM) 222. In this case, a control device of the image pickup apparatus 1 includes the system controller (control unit) 223 and the EEPROM (storage unit) 222. The control device of the image pickup apparatus 1 is arranged in the camera body 200. Note that, the control device of the image pickup apparatus 1 may be arranged in the lens unit 100.

The system controller 223 is connected to a lens control unit 104 configured to control a lens drive mechanism 103 for moving the photographing lens 101 in an optical axis direction for focusing, and a diaphragm control unit 106 configured to control a diaphragm drive mechanism 105 for driving the diaphragm 102. Further, the system controller 223 is connected to a shutter charge/mirror drive mechanism 211 configured to control an up/down drive of the quick return mirror 202 and a shutter charge drive of the focal-plane shutter 208.

The system controller 223 is also connected to a shutter control mechanism 212 configured to control travel of the front curtain and the rear curtain of the focal-plane shutter 208, and a light metering unit 207, which is connected to a light metering sensor arranged near the eyepiece lens 206, and is configured to perform automatic exposure control. In addition, the system controller 223 is connected to the EEPROM 222, which stores parameters requiring adjustment in order to control the camera body 200, camera identification (ID) information for identifying individual image pickup apparatus, an AF correction value (adjustment value) adjusted by a reference lens, an automatic exposure correction value, and the like.

The EEPROM (storage unit) 222 also stores operation constants and programs for the system controller 223. The term "program" as used herein refers to the programs for executing the various flowcharts described later in this embodiment.

The system controller 223 is configured to realize the various processes according to this embodiment that are described later by controlling the entire lens unit 100 and camera body 200, and executing the programs recorded in the EEPROM 222. Operation constants and variables of the system controller 223, programs read from the EEPROM 222, and the like are loaded into a dynamic random-access memory (DRAM) 221.

The lens control unit 104 includes a storage unit (not shown) configured to store information unique to a lens (e.g., focal length, maximum aperture, a lens ID assigned to each lens, lens type, manufacturer information, the state of the lens, and other such information), and information received from the system controller 223.

The camera body 200 may be connected to an external control device 300, which is represented by a personal computer (PC). In such a case, the system controller 223 may communicate to and from the external control device 300 via a communication interface unit 224.

The light metering sensor (not shown) connected to the light metering unit 207 is a sensor for measuring the luminance of the object. The output of the light metering sensor is supplied to the system controller 223 via the light metering unit 207.

The system controller 223 is configured to form an object image on the image pickup element 210 by controlling the lens drive mechanism 103 via the lens control unit 104 to drive the photographing lens 101. Further, the system controller 223 is configured to control the diaphragm drive mechanism 105, which is configured to drive the diaphragm 102, via the diaphragm control unit 106 based on an Av value set in accordance with the photography mode, and to output a control signal to the shutter control mechanism 212 based on a set Tv value.

The drive source of the front curtain and the rear curtain of the focal-plane shutter 208 is configured by a spring. After shutter travel, the spring needs to be charged for the next operation. The shutter charge/mirror drive mechanism 211 is configured to control charging of the spring. Further, the quick return mirror 202 is moved up and down by the shutter charge/mirror drive mechanism 211.

The system controller 223 is also connected to an image data controller 220. The image data controller 220, which is configured by a digital signal processor (DSP), is configured to execute control of the image pickup element 210 and correction and processing of image data input from the image pickup element 210 based on commands from the system controller 223.

Auto white balance is also included in the items for image data correction/processing by the image data controller 220. Auto white balance is a function for correcting the maximum luminance portion in a photographed image to a predetermined color (white). Note that, auto white balance allows a correction amount to be changed based on a command from the system controller 223.

The image data controller 220 is connected to an analog-to-digital (AD) converter 216 and a timing pulse generation unit 217 configured to output a pulse signal required when driving the image pickup element 210. In response to receiving a timing pulse generated by the timing pulse generation unit 217 together with the image pickup element 210, the A/D converter 216 is configured to convert an analog signal corresponding to the object image output from the image pickup element 210 into a digital signal. Further, the image data controller 220 is connected to the DRAM 221 that temporarily stores the obtained image data (digital data), a digital-to-analog (D/A) converter 215, and an image compression unit 219.

The DRAM 221 temporarily stores image data that is yet to be subjected to processing or data conversion into a predetermined format. The D/A converter 215 is connected to an image display unit (display unit) 213 via an encoder unit 214. Further, the image compression unit 219 is connected to an image data recording medium 218.

The image display unit 213 is configured to display image data photographed by the image pickup element 210. In general, the image display unit 213 is configured by a color liquid crystal display element. The image data controller 220 is configured to convert image data on the DRAM 221 into an analog signal by the D/A converter 215 for output to the encoder unit 214. The encoder unit 214 is configured to convert the output of the D/A converter 215 into a video signal (e.g., a National Television System Committee (NTSC) signal) necessary when driving the image display unit 213.

The image compression unit 219 is a unit for compressing and converting (e.g., into a Joint Photographic Experts Group (JPEG) image) the image data stored in the DRAM 221. The compressed image data is stored in the image data recording medium 218. As the image data recording medium 218, a hard disk, a flash memory, a Floppy (trademark) disk, and the like is used.

The system controller 223 is connected to an operation display unit 225 for displaying information on an operation mode of the camera body 200 and exposure information (shutter speed, aperture value, etc.). Further, the system controller 223 is connected to a first release switch (release SW1) 231 for starting a photography preparation operation, such as light metering and distance measurement, and a second release switch (release SW2) 230 for starting a photography operation.

In addition, the system controller 223 is connected to a mode setting switch 229 for setting a mode that causes the camera body 200 to execute the operation desired by the user, and a determination switch 227 serving as an image selection unit and a unit for performing various settings, such as a menu setting. Still further, the system controller 223 is connected to a bracket amount setting switch 232 for setting a bracket amount, and an electronic dial switch 226 for displaying parameters in a vertical manner by performing a rotation operation. The system controller 223 is also connected to a menu switch 236, a playback switch 237, and an enlarge/reduce switch 238.

For example, when the menu switch 236 is pressed by the user, a menu screen from which various settings may be set is displayed on the image display unit 213. The user may intuitively set various settings, such as a menu setting, by using the menu screen displayed on the image display unit 213, the electronic dial switch 226, the determination switch 227, and the like.

Further, for example, when the playback switch 237 is pressed, a playback screen from which various settings may be set is displayed on the image display unit 213. Image data recorded in the image data recording medium 218 is displayed on the playback screen. When the enlarge/reduce switch 238 is pressed in the playback screen, the image is displayed on the image display unit 213 in an enlarged or reduced manner. The user may intuitively set various settings, such as image scrolling, designation of an enlargement position, and enlarge/reduce, by using the playback screen displayed on the image display unit 213, the electronic dial switch 226, the determination switch 227, the enlarge/reduce switch 238, and the like.

A counter 233 is configured to count a release count when performing various types of bracketing photography. The counter 233 is connected to the system controller 223. Resetting of the count value of the counter 233 is performed by the system controller 223.

<Principles of Defocus Amount Detection>

Next, the principles of defocus amount detection (detection of a focus position deviation amount) are described with reference to FIG. 2A to FIG. 2C and FIG. 3. FIG. 2A to FIG. 2C are diagrams for illustrating the principles of defocus amount detection. In FIG. 2A, a state is illustrated in which the focus is on a light-receiving surface of the image pickup element 210. In FIG. 2B, a front-focus state is illustrated. In FIG. 2C, a back-focus state is illustrated. The diagrams of FIG. 2A to FIG. 2C include an object surface 301, a surface 302 equivalent to a light-receiving surface of the image pickup element 210, namely, an image pickup element equivalent surface, a condenser lens 303, a diaphragm mask 304, and a separator lens 305.

As illustrated in FIG. 2A, when the focus is on the light-receiving surface of the image pickup element 210, a two-image interval on the AF sensor (line sensor) 204 takes a given value. Although this value may be determined based on the design, the value is not always the same as the design value due to factors such as the dimensions of the parts, variation, and assembly errors. Therefore, a two-image interval (referred to as a "reference two-image interval") Lo obtained by actually measuring the images when the images are in focus needs to be determined. When the two-image interval is narrower than the reference two-image interval Lo, the focus is in the front-focus state illustrated in FIG. 2B, and when the two-image interval is wider than the reference two-image interval Lo, the focus is in the back-focus state illustrated in FIG. 2C.

Figure 3:
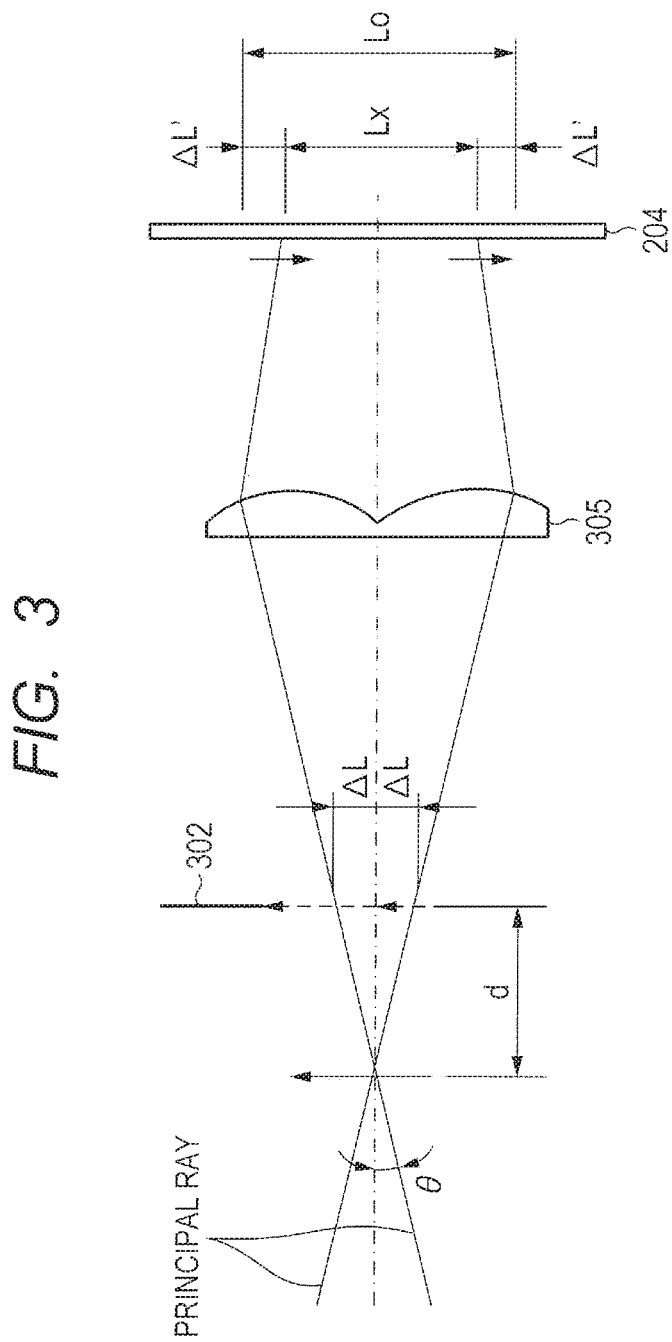
FIG. 3 is a diagram for illustrating the principles of defocus amount detection.

FIG. 3 is a diagram for illustrating a model that excludes the condenser lens from the optical system of the AF sensor module. As illustrated in FIG. 3, when an angle of a principal ray is represented as θ, a magnification of the separator lens is represented as β, and movement amounts of the images are represented as ΔL and ΔL', a defocus amount L is determined based on Expression (1).

$$d = \frac{\Delta L}{\tan\theta} = \frac{\Delta L'}{\beta \cdot \tan\theta} \quad (1)$$

In Expression (1), β tan θ represents a parameter determined based on the design of the AF sensor module, and ΔL' may be determined based on the reference two-image interval (Lo) and a current two-image interval (Lx).

A plurality of AF sensors 204 are arranged in a manner such that the focus can be detected at a plurality of positions on the photography screen. In AF function focus adjustment, a two-image interval obtained from the AF sensor 204 by using the photographing lens 101 having a known focus position so that the focus position is at a position on the optical axis of the image pickup element 210 (assembly error of the image pickup element 210) is stored in the EEPROM 222 as an AF focus correction parameter. However, when the photographing lens 101 mounted to the image pickup apparatus 1 is changed, variation occurs in the focus position due to manufacturing error of the photographing lens 101 itself.

Therefore, the system controller 223 is configured to execute an AF calibration mode (AF correction mode) for calculating an AF correction value in order to correct the focus position based on information from the AF sensors 204 and information on the photographing lens 101 mounted to the camera body 200. As a result, the system controller 223 calculates an AF correction value for each photographing lens 101 so that the variation of each photographing lens 101 can be corrected.

Next, sequences performed by the system controller 223 in order to utilize the AF correction value (CAL data) during normal photography by adjusting the AF correction value (CAL data) based on the AF calibration mode are described with reference to FIG. 4 to FIG. 7.

A sequence for setting the photography mode and setting the AF calibration mode are described with reference to FIG. 4. Each process in the flowchart is realized by the system controller 223 executing a program stored in the EEPROM 222.

Figure 4:
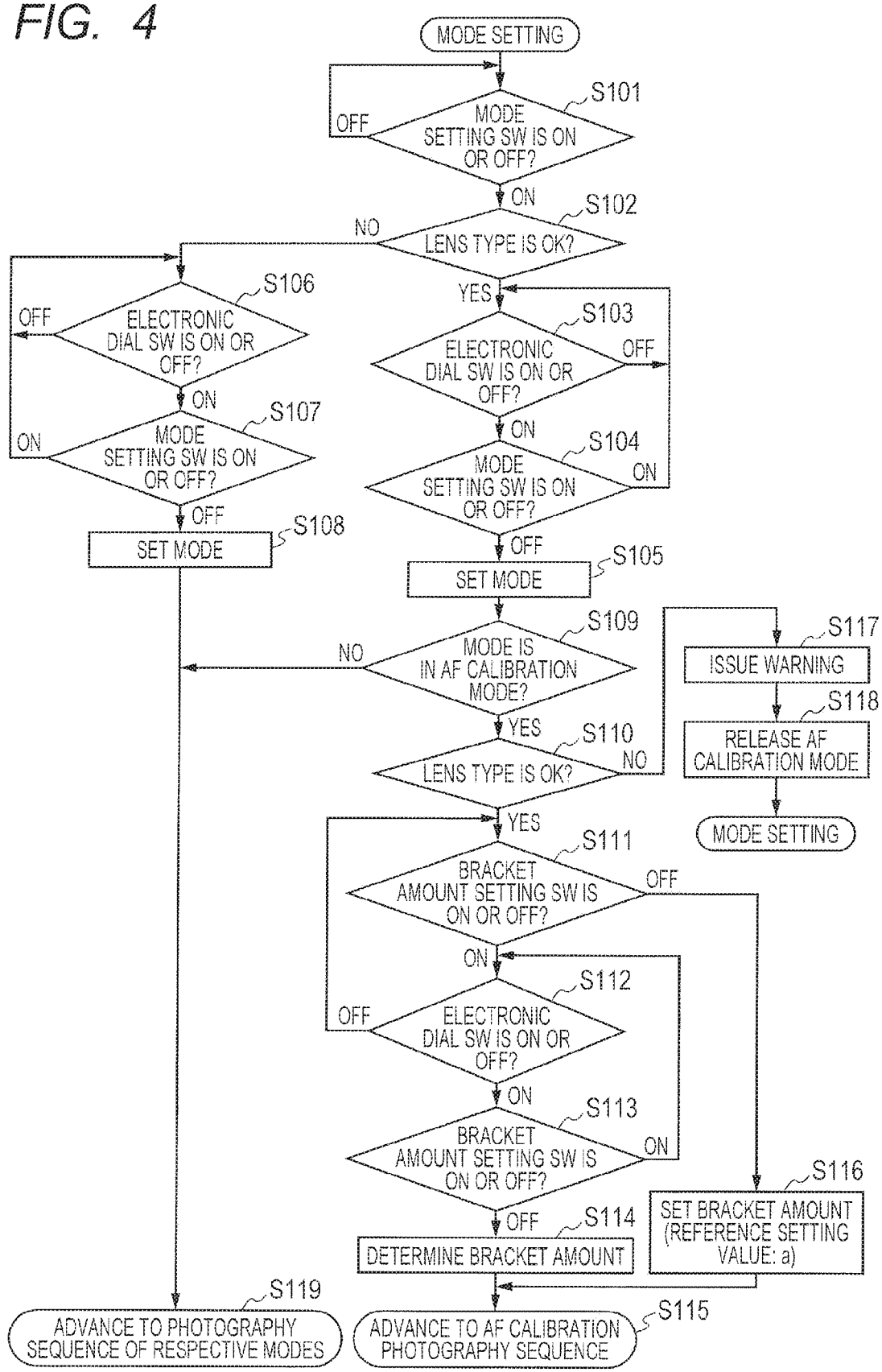
FIG. 4 is a flowchart for illustrating a mode setting sequence.

Note that, when the menu switch 236 is pressed, a power supply control unit (not shown) of the image pickup apparatus 1 is activated, power starts to be supplied to the system controller 223, and the system controller 223 executes the various processes (Step S101 to Step S119) starting from Step S101 of FIG. 4.

In Step S101, the system controller 223 determines whether or not the mode setting switch 229 has been turned ON. When the mode setting switch 229 has been turned ON, the system controller 223 determines that a mode setting operation has been started by the user, and the system controller 223 advances the processing to Step S102.

In Step S102, the system controller 223 determines whether or not the lens unit 100 (photographing lens 101) is mounted by performing a state determination (type determination) of the photographing lens 101 of the lens unit 100 mounted to the camera body 200. Further, at this time, based on information unique to the photographing lens 101 from the lens control unit 104, the system controller 223 determines whether or not a calculation operation of the AF correction value can be performed in the AF calibration mode by the mounted photographing lens 101.

When the lens unit 100 (photographing lens 101) is not mounted to the camera body 200, the system controller 223 determines that the AF calibration mode cannot be selected and set, and advances the processing to Step S106 in order to set the normal photography mode (NO in Step S102). Further, when the photographing lens 101 is mounted to the camera body 200 (YES in Step S102), the system controller 223 advances the processing to Step S103.

In addition, in Step S102, the system controller 223 also determines whether or not the AF calibration mode can be selected and set based on information unique to the photographing lens 101 from the lens control unit 104. When it is determined that the AF calibration mode can be selected and set (YES in Step S102), the system controller 223 advances the processing to Step S103. Then, in Step S103, the system controller 223 selects and sets the normal photography mode and AF calibration mode, which are described later. Further, when the AF calibration mode cannot be selected and set (NO in Step S102), the system controller 223 advances the processing to Step S106, and sets the normal photography mode, which is described later.

Note that, when it is determined in Step S102 that a photographing lens is mounted that is incapable of being set to the AF calibration mode, the system controller 223 determines that the AF calibration mode cannot be set, and prohibits the selection operation.

In Step S106, the system controller 223 detects an operation click count of the electronic dial switch 226 for mode selection by using the counter 233. When the user rotates the electronic dial switch 226, for each operation click, the photography mode changes through a cycle from "TV"→"AV"→"P"→"TV" . . . . Further, when the user rotates the electronic dial switch 226 in the opposite direction, for each operation click, the selection mode changes through a cycle from "TV"→"P"→"AV"→"TV" . . . .

In Step S107, the system controller 223 determines whether or not the mode setting switch 229 has been turned OFF. When the mode setting switch 229 has been turned OFF, in Step S108, the system controller 223 sets the image pickup apparatus 1 to the photography mode selected at that point, and advances the processing to a photography sequence (not shown) (Step S119) in accordance with each photography mode.

When it is determined that a calculation operation of the AF correction value may be performed in the AF calibration mode for the mounted photographing lens 101 (YES in Step S102), the system controller 223 advances the processing to Step S103. In Step S103, the system controller 223 detects the operation click count of the electronic dial switch 226 for mode selection by using the counter 233.

When the user rotates the electronic dial switch 226, for each operation click, the photography mode and the AF calibration mode change through a cycle from "TV"→"AV"→"P"→"AF calibration"→"TV" . . . . Further, when the user rotates the electronic dial switch 226 in the opposite direction, for each operation click, the selection mode and the AF calibration mode change through a cycle from "TV"→"AF calibration"→"P"→"AV"→"TV" . . . .

In Step S104, the system controller 223 determines whether or not the mode setting switch 229 has been turned OFF. When the mode setting switch 229 has been turned OFF, in Step S105, the system controller 223 sets the photography mode of the image pickup apparatus 1 to the photography mode selected at that point or the AF calibration mode.

In Step S109, the system controller 223 determines whether or not the mode set in Step S105 is the AF calibration mode. When the mode set in Step S105 is a mode other than the AF calibration mode (NO in Step S109), the system controller 223 advances the processing to Step S119, and proceeds to the photography sequence (not shown) in accordance with the set photography mode.

When it is determined in Step S109 that the mode set in Step S105 is the AF calibration mode (YES in Step S109), in Step S110, the system controller 223 again performs a state determination (type determination) of the photographing lens 101 mounted to the camera body 200.

When it is determined in Step S110 that an operation can be performed by the photographing lens 101 mounted to the camera body 200 (YES in Step S110), the system controller 223 determines that a preparation operation for photography in the AF calibration mode can be set, and advances the processing to Step S111.

Further, when it is determined that the mode set in Step S105 is the AF calibration mode, but for one of the reasons described above, operation in the AF calibration mode cannot be performed (NO in Step S110), the system controller 223 advances the processing to Step S117. In Step S117, the system controller 223 issues a warning to the user, and then in Step S118 releases the AF calibration mode. As a result, the image pickup apparatus is in the photography mode setting processing state.

In Step S111, the system controller 223 determines whether or not the bracket amount setting switch 232 has been turned ON in order to set an AF bracket amount to be used during photography in the AF calibration mode, namely, during AF calibration photography. When the bracket amount setting switch 232 has been turned ON, the system controller 223 advances the processing to Step S112. When the bracket amount setting switch 232 has not been turned ON (OFF in Step S111), in Step S116, the system controller 223 sets the AF bracket amount to be used during AF calibration photography to a reference setting value a, and then advances the processing to the photography sequence in the AF calibration mode (Step S115).

In Step S112, the system controller 223 detects the operation click count of the electronic dial switch 226. The user can rotate the electronic dial switch 226 in an arbitrary direction to cause the AF bracket step amount to change, for each operation click from a reference value a, from "reference value a×0.25"⇆"reference value a×0.5"⇆"reference value a"⇆"reference value a×2"⇆"reference value a×4". Further, the "reference value a×0.25" and "reference value a×4" may be set as an upper limit and a lower limit, respectively, and operation of the electronic dial to try and change the AF bracket step amount to beyond those limits may be ignored.

The reference value a of the AF bracket step amount is determined based on Expression (2) by the system controller 223 receiving maximum aperture value information (FNO) from the diaphragm control unit 106.

$$a = FNO \times \epsilon \quad (2)$$

In Expression (2), FNO represents maximum aperture value information, and a represents a diameter of a permissible circle of confusion. Further, in this embodiment, the reference value a is set to the same value as "focal depth $\delta = FNO \times \epsilon$", and $\epsilon = 0.03$ mm.

Varying the AF bracket step amount enables the following to be performed. Specifically, even when a large focus correction is necessary, the focus correction amount can be narrowed down to an appropriate value by changing the AF bracket step amount to be used in photography in the AF calibration mode in stages a plurality of times (from a large step amount to a small step amount).

In Step S113, the system controller 223 determines whether or not the bracket amount setting switch 232 has been turned OFF. When the bracket amount setting switch 232 has been turned OFF, in Step S114, the system controller 223 sets a bracket step amount "A" for the bracket step amount selected in Step S113. Then, the system controller 223 advances the processing to the photography sequence in the AF calibration mode (Step S115).

Figure 5:
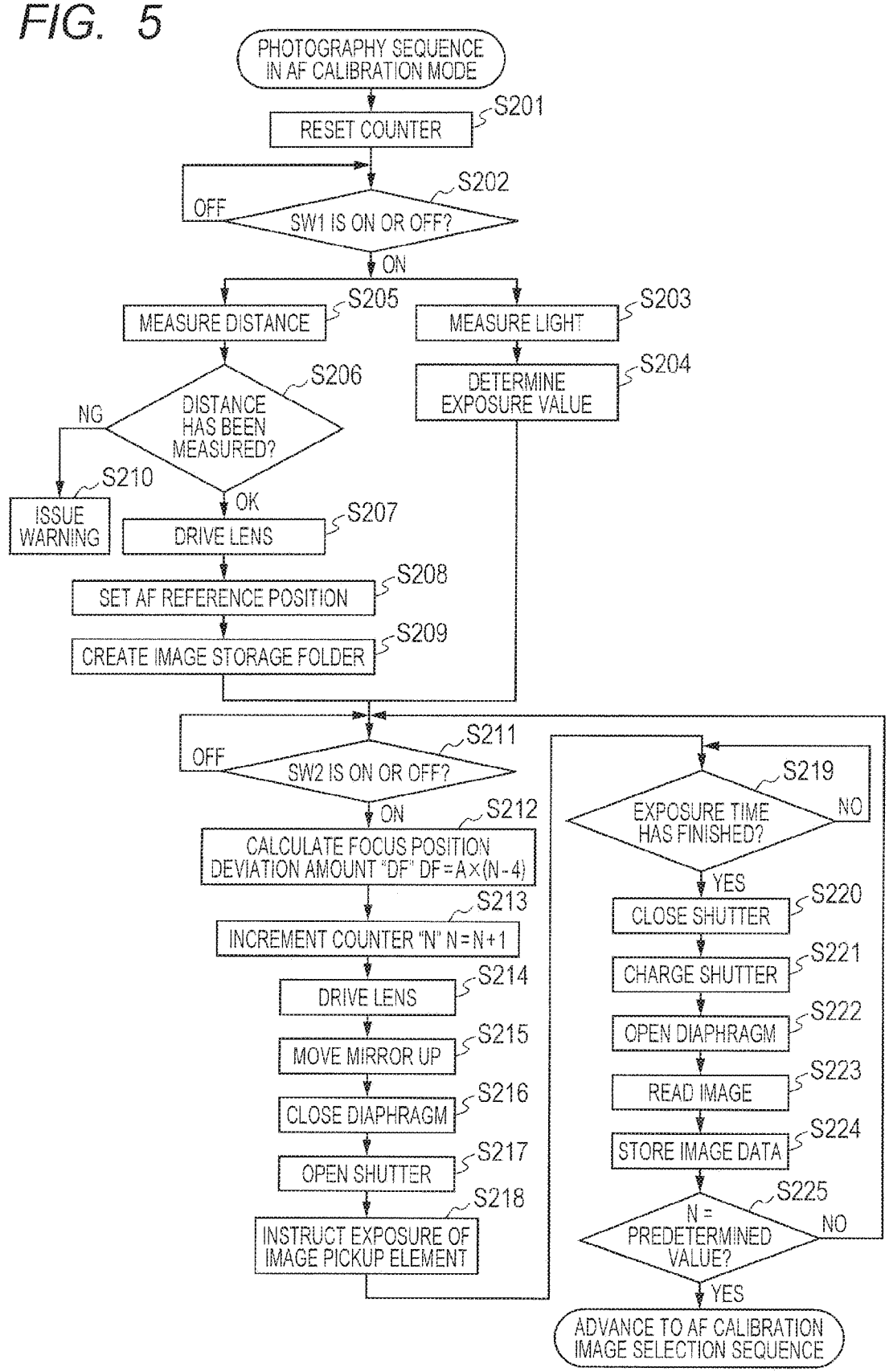
FIG. 5 is a flowchart for illustrating a photography sequence in an AF calibration mode.

Next, the photography sequence in the AF calibration mode (Step S115) is described with reference to FIG. 5. The photography sequence in the AF calibration mode is controlled by the system controller 223.

In Step S201, the system controller 223 resets a count N of the counter 233 (e.g., N=0). In this case, N is an integer that is used as an index indicating the photography order of bracketing photography. In Step S202, the system controller 223 determines whether or not the first release switch (release SW1) 231 has been turned ON. When the first release switch 231 has been turned ON, the system controller 223 advances the processing to Step S203 and Step S205 for determining a photography exposure.

In Step S203, the light metering unit 207 measures the light fluxes that have passed through the photographing lens 101, been reflected by the quick return mirror 202, and passed through the pentaprism 201. In Step S204, the system controller 223 determines an exposure amount (aperture value information) during photography based on the output of the light metering unit 207.

In Step S205, the system controller 223 measures the distance to the object by using the AF sensors 204 and a focus detection unit 205. In Step S206, the system controller 223 determines whether or not the distance has been measured. In some cases, such as when the measured object has a low contrast or when it is dark, the distance to the object cannot be measured. When the distance cannot be measured (NG in Step S206), in Step S210, the system controller 223 issues a warning.

In Step S207, the system controller 223 transmits a lens drive amount to the lens control unit 104 based on the distance measurement result obtained in Step S205. The lens control unit 104 is configured to control the lens drive mechanism 103 based on the transmitted lens drive amount. The lens drive mechanism 103 is configured to drive the photographing lens 101 to the focus position. At this stage, when the image pickup apparatus 1 already has the AF correction amount (CAL data), the lens drive amount is calculated as follows.

Lens drive amount=Distance measurement result+AF correction amount during manufacturing (adjustment data)+AF correction amount (CAL data)

In Step S208, the system controller 223 sets and stores the position of the photographing lens 101 driven in Step S207 as an AF reference position. In Step S209, the system controller 223 instructs the image data controller 220 to create a folder in the image data recording medium 218 for storing the image data acquired by photography in the AF calibration mode, namely, AF calibration image data. In response to this creation instruction, the image data controller 220 creates a folder in the image data recording medium 218 for storing the AF calibration image data via the image compression unit 219.

In Step S211, the system controller 223 determines whether or not the second release switch (release SW2) 230 has been turned ON. When the second release switch 230 has been turned ON, the system controller 223 advances the processing to Step S212.

In Step S212, the system controller 223 performs a focus position deviation amount "DF" calculation. The system controller 223 receives the current count N from the counter 233, and calculates the focus position deviation amount "DF" based on the following expression.

$$DF = A \times (N-4)$$

In Step S213, the system controller 223 increments the count N of the counter 233 by one (N=N+1) In Step S214, the system controller 223 transmits the focus position deviation amount "DF" calculated in Step S212 to the lens control unit 104. In response to receiving the transmitted focus position deviation amount "DF", the lens control unit 104 controls the lens drive mechanism 103 to drive the photographing lens 101 to the position of the focus position deviation amount "DF".

In Step S215, the system controller 223 controls the shutter charge/mirror drive mechanism 211 to move the quick return mirror 202 up. In Step S216, the system controller 223 transmits the aperture value information set in Step S204 to the diaphragm control unit 106. In response to receiving the transmitted aperture value information, the diaphragm control unit 106 drives the diaphragm drive mechanism 105 to close the diaphragm 102 to the set aperture value.

In Step S217, the system controller 223 controls each unit so as to open the focal-plane shutter 208. In Step S218, the system controller 223 instructs the image data controller 220 (DSP) to perform an exposure operation of the image pickup element 210. In Step S219, the system controller 223 waits for a predetermined duration, and when the exposure time has finished (YES in Step S219), advances the processing to Step S220. In Step S220, the system controller 223 controls each unit so as to close the focal-plane shutter 208.

In Step S220 and Step S221, the system controller 223 charges the focal-plane shutter 208 and drives the mirror down in preparation for the next operation. In Step S222, the system controller 223 drives the diaphragm 102 to an open position via the diaphragm control unit 106 and the diaphragm drive mechanism 105.

In Step S223, the system controller 223 instructs the image data controller 220 to obtain image data from the image pickup element 210. During this step, the image data to be obtained from the image pickup element 210 may be image data of a limited area including the focusing point used in AF.

In Step S224, the system controller 223 transmits the current focus position deviation amount "DF" to the image data controller 220. In response to receiving the transmitted focus position deviation amount "DF", the image data controller 220 associates an N value, lens ID information, the image data, and the focus position deviation amount "DF", and records the associated data in the image data recording medium 218 via the image compression unit 219.

Figure 6:
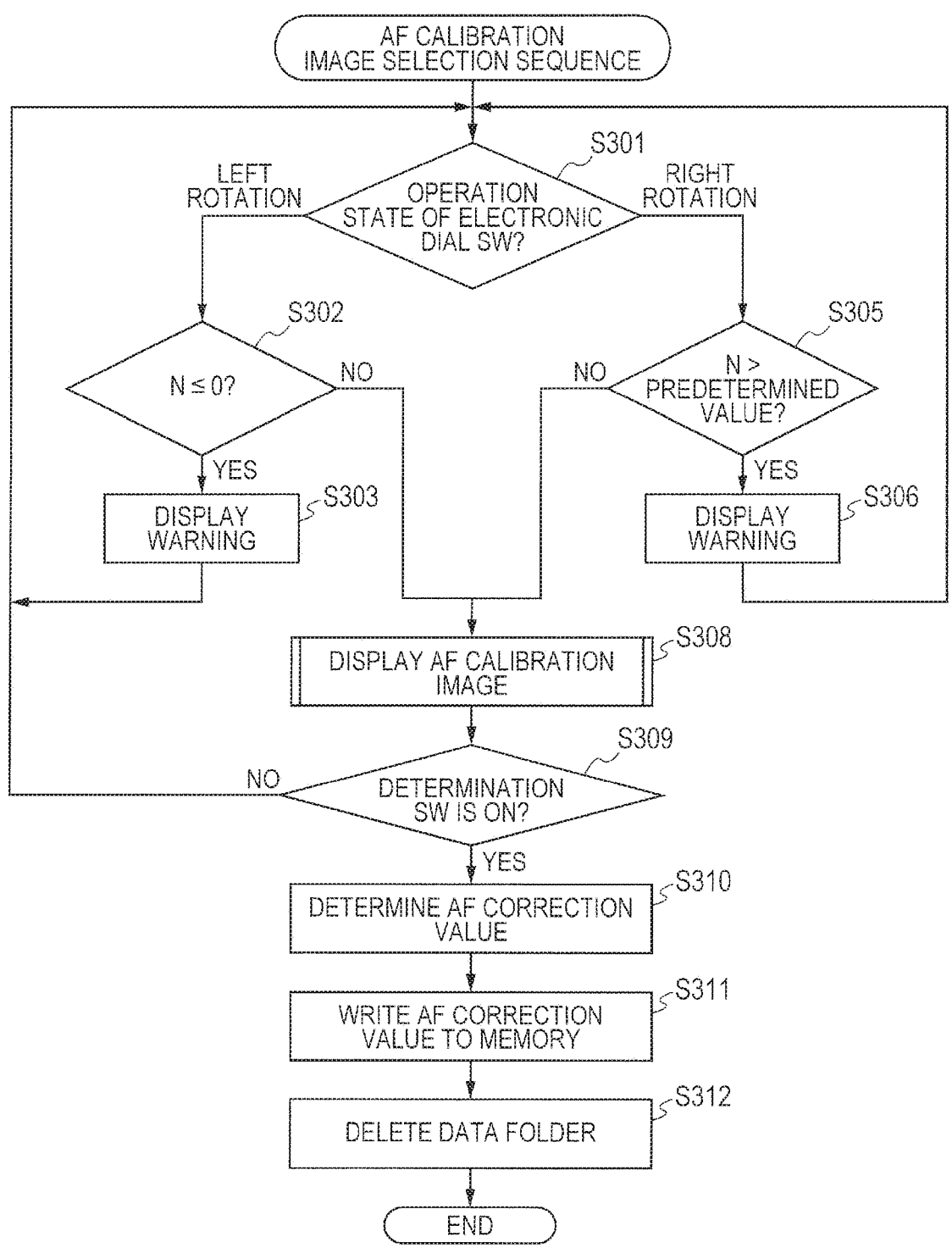
FIG. 6 is a flowchart for illustrating a selection sequence of an AF calibration image.

In Step S225, the system controller 223 confirms the value of the count N of the counter 233. When the count N is a predetermined value, the system controller 223 determines that the photography sequence in the AF calibration mode is complete, and advances the processing to the selection sequence of the image acquired by photography in the AF calibration mode, namely, the AF calibration image (FIG. 6). Note that, the predetermined value is, for example, 7.

Next, the selection sequence of the AF calibration image is described with reference to FIG. 6.

In Step S301, the system controller 223 detects the operation state of the electronic dial switch 226. Operation of the electronic dial switch 226 is counted by the counter 233 (count N). When the electronic dial switch 226 is rotated to the left (decrement in the count: N=N−1), the system controller 223 advances the processing to Step S302. When the electronic dial switch 226 is rotated to the right (increment in the count: N=N+1), the system controller 223 advances the processing to Step S305. Note that, the initial count N in Step S301 may be the above-mentioned predetermined value (e.g., 7), or may be 1.

In Step S302, the system controller 223 determines whether or not the count N of the counter 233 is equal to or less than "0". When the count N of the counter 233 is equal to or less than "0" (YES in Step S302), in Step S303, the system controller 223 issues a warning by using the image display unit 213 and/or a buzzer (not shown) that there is no AF calibration image data that can be selected and displayed, and then returns the processing to Step S301. When the count N of the counter 233 is more than "0" (NO in Step S302), the system controller 223 advances the processing to Step S308.

In Step S305, the system controller 223 determines whether or not the count N of the counter 233 is more than a predetermined value (e.g., 7). The predetermined value is the same as the predetermined value in Step S225. When the count N of the counter 233 is more than the predetermined value (YES in Step S305), in Step S306, the system controller 223 issues a warning by using the image display unit 213 and/or the buzzer that there is no AF calibration image data that can be selected and displayed, and then returns the processing to Step S301. When the count N of the counter 233 is equal to or less than the predetermined value (NO in Step S305), the system controller 223 advances the processing to Step S308.

In Step S308, the system controller 223 reads the AF calibration image data corresponding to the count N, which changes based on operation of the electronic dial switch 226, from the image data recording medium 218, and displays the read image on the image display unit 213. Step S308, in which the AF calibration image is displayed, is described later.

In Step S309, the system controller 223 determines whether or not the determination switch 227 has been turned ON. When the determination switch 227 has been turned ON, the system controller 223 advances the processing to Step S310, and when the determination switch 227 has not been turned ON, the system controller 223 returns the processing to Step S301.

In Step S310, the system controller 223 determines the focus position deviation amount "DF", which is recorded in the image data recording medium 218 in association with the AF calibration image data when the determination switch 227 was turned ON in Step S309, as the AF correction value (CAL data). In Step S311, the system controller 223 writes the AF correction value (CAL data) determined in Step S310 in the EEPROM 222 together with the lens ID of the lens control unit 104.

In Step S312, the system controller 223 deletes all of the AF calibration image data and the folder for the AF calibration image data from the image data recording medium 218.

Figure 7:
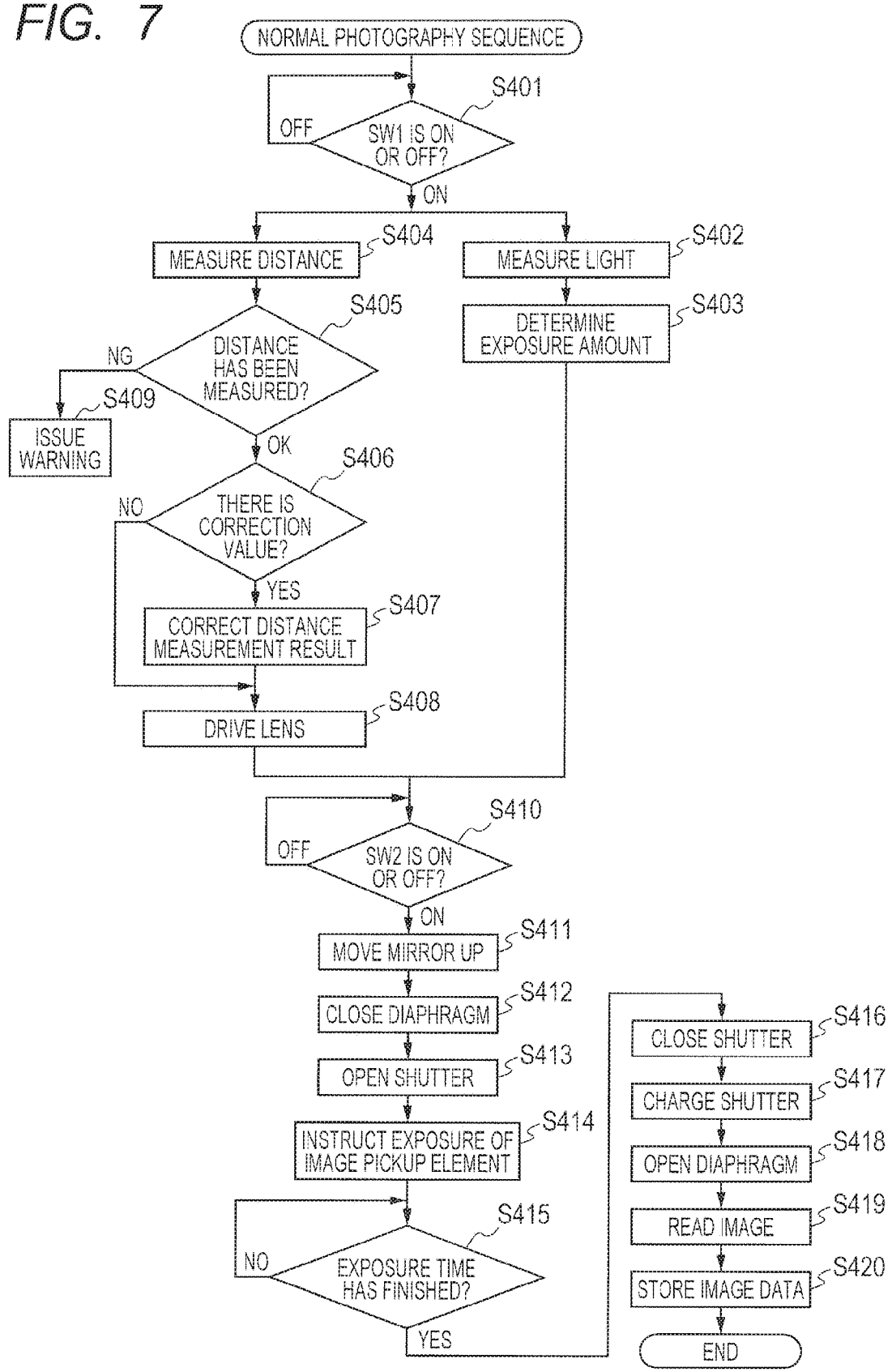
FIG. 7 is a flowchart for illustrating a photography sequence in a normal photography mode.

Next, a normal photography sequence is described with reference to FIG. 7. Each process in the flowchart is realized by the system controller 223 executing a program stored in the EEPROM 222. When the first release switch (release SW1) 231 is pressed, the power supply control unit (not shown) is activated, power starts to be supplied to the system controller 223, and the system controller 223 starts to execute the processing from Step S401 of FIG. 7.

In Step S401, the system controller 223 determines whether or not the first release switch (release SW1) 231 has been turned ON. When the first release switch 231 has been turned ON, the system controller 223 splits and advances the processing to Step S402 and Step S404 for determining the photography exposure. When the first release switch 231 has not been turned ON, the system controller 223 repeats the processing of Step S401.

In Step S402, the light metering unit 207 measures the light fluxes that have passed through the photographing lens 101, been reflected by the quick return mirror 202, and passed through the pentaprism 201. In Step S403, the system controller 223 determines the exposure amount during photography based on the output of the light metering unit 207.

In Step S404, the system controller 223 measures the distance to the object by using the AF sensors 204 and the focus detection unit 205. In Step S405, the system controller 223 determines whether or not the distance has been measured in Step S404. In some cases, such as when the measured object has a low contrast or when it is dark, the distance to the object cannot be measured. When the distance cannot be measured (NG in Step S405), in Step S409, the system controller 223 issues a warning. When the distance has been measured (OK in Step S405), the system controller 223 advances the processing to Step S406.

In Step S406, the system controller 223 receives lens ID information from the lens control unit 104, and determines whether or not the AF correction value (CAL data) relating to the photographing lens 101 (identified by the lens ID) mounted to the camera body 200 is stored in the EEPROM 222. When the AF correction value is not stored in the EEPROM 222 (NO in Step S406), the system controller 223 does not add an AF correction value to the focus detection result.

When the AF correction value is stored in the EEPROM 222 (YES in Step S406), in Step S407, the system controller 223 adds the AF correction value (CAL data) to the distance measurement result. In other words, when the image pickup apparatus 1 already has the AF correction amount (CAL data), the lens drive amount is calculated as follows.

Lens drive amount=Distance measurement result+AF correction amount during manufacturing (adjustment data)+AF correction amount (CAL data)

In Step S408, the system controller 223 transmits the lens drive amount to the lens control unit 104 based on the distance measurement result. The lens control unit 104 is configured to control the lens drive mechanism 103 based on the transmitted lens drive amount. The lens drive mechanism 103 is configured to drive the photographing lens 101 to the focus position.

In Step S410, the system controller 223 determines whether or not the second release switch (release SW2) 230 has been turned ON. When the second release switch 230 has been turned ON, the system controller 223 advances the processing to Step S411. In Step S411, the system controller 223 controls the shutter charge/mirror drive mechanism 211 to move the quick return mirror 202 up.

In Step S412, the system controller 223 transmits the aperture value information set in Step S204 to the diaphragm control unit 106, and drives the diaphragm drive mechanism 105 to close the diaphragm 102 to the set aperture value.

In Step S413, the system controller 223 controls each unit so as to open the focal-plane shutter 208. In Step S414, the system controller 223 instructs the image data controller 220 (DSP) to perform an exposure operation of the image pickup element 210. In Step S415, the system controller 223 waits for a predetermined duration, and when the exposure time has finished, advances the processing to Step S416. In Step S416, the system controller 223 controls each unit so as to close the focal-plane shutter 208.

In Step S417, the system controller 223 charges the focal-plane shutter 208 and drives the mirror down in preparation for the next operation. In Step S418, the system controller 223 drives the diaphragm 102 to an open position via the diaphragm control unit 106 and the diaphragm drive mechanism 105. In Step S419, the system controller 223 instructs the image data controller 220 to obtain image data from the image pickup element 210. In Step S420, the system controller 223 passes the image data read by the image data controller 220 through the image compression unit 219, and records the compressed image data in the image data recording medium 218.

As described above with reference to FIG. 4 to FIG. 7, the AF correction value (CAL data) may be used in normal photography (normal photography mode) by adjusting the AF correction value (CAL data) based on AF calibration.

Next, the display processing of the AF calibration image in Step S308 of FIG. 6 is described.

The camera body 200 includes "AF calibration image display" and "normal image display" as image display modes. "AF calibration image display" is an image display mode that is activated in the AF calibration mode. On the other hand, "normal image display" is an image display mode that is activated in playback mode for playing back and displaying an image photographed in the normal photography mode.

In order to facilitate comparison with the display operation of the AF calibration image, first, the display processing of a normal image is described.

Figure 8:
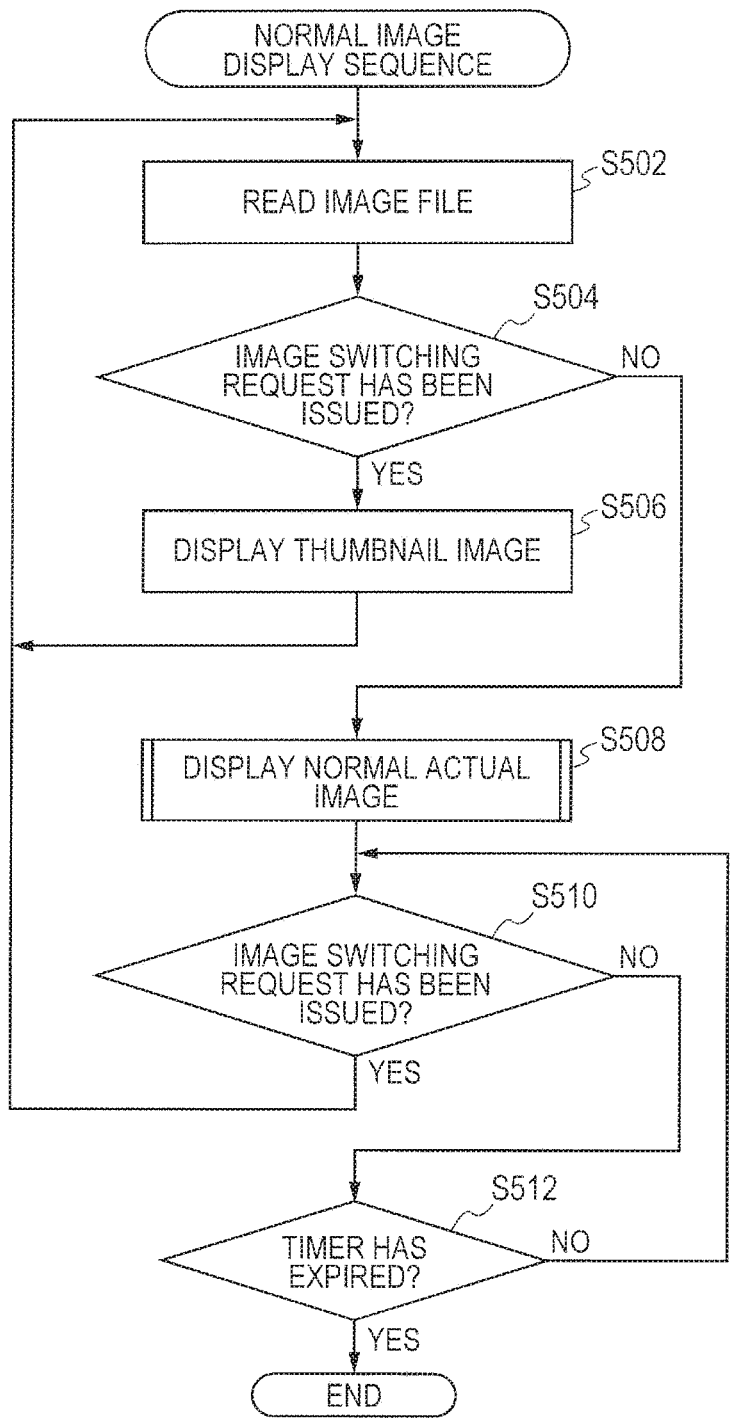
FIG. 8 is a flowchart for illustrating a display sequence of a normal image.

FIG. 8 is a flowchart for illustrating display processing of the normal image according to this embodiment. Each process in the flowchart illustrated in FIG. 8 is realized by the system controller 223 executing a program stored in the EEPROM 222.

When the playback switch 237 is pressed by the user, the power supply control unit (not shown) is activated, power starts to be supplied to the system controller 223, and the system controller 223 starts to execute the processing from Step S502 of FIG. 8.

In Step S502, the system controller 223 reads an image file stored in the image data recording medium 218. Now, the following description is given based on a case in which, as a common file configuration, one image file is configured from a photography setting, a thumbnail image, and an actual image.

In Step S504, the system controller 223 determines whether or not an image switching request has been issued based on operation of the electronic dial switch 226 by the user. When an image switching request has been issued, the system controller 223 advances the processing to Step S506, and when an image switching request has not been issued, the system controller 223 advances the processing to Step S508. In Step S506, the system controller 223 displays the thumbnail image included in the image file read in Step S502 on the image display unit 213.

A method of switching between an actual image display and a thumbnail image display is now described with reference to FIG. 10A and FIG. 10B.

Figure 10A:
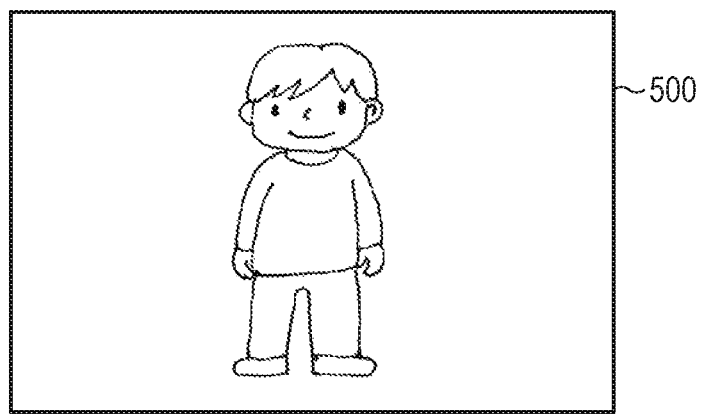
FIGS. 10A and 10B are diagrams for showing examples of display images in the normal photography mode.
Figure 10B:
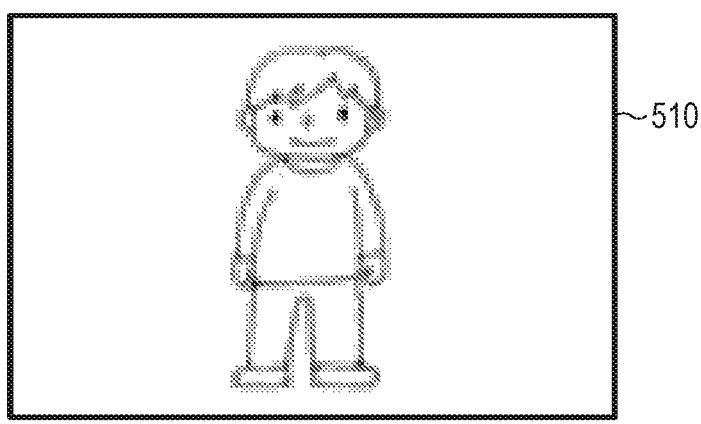

In a normal image display, an actual image 500 such as that shown in FIG. 10A is displayed on the image display unit 213. However, in some cases, an image switching request is issued before the actual image 500 is displayed due to the user operating the electronic dial switch 226. In such a case, waiting until after the actual image 500 is displayed in order to switch images results in the switching operation taking a long time, because the display load of the actual image is large. Therefore, in this embodiment, when an image switching request is issued before the actual image 500 is displayed, the time taken in order to switch images is reduced by displaying a thumbnail image 510 such as that shown in FIG. 10A, which has a low display load, and then proceeding to display of the next image.

Returning to the description of FIG. 8, in Step S508, the system controller 223 calls a function for displaying the actual image of the normal image, namely, a normal actual image. Now, a sequence of the function for displaying the normal actual image is described with reference to the flowchart of FIG. 9.

Figure 9:
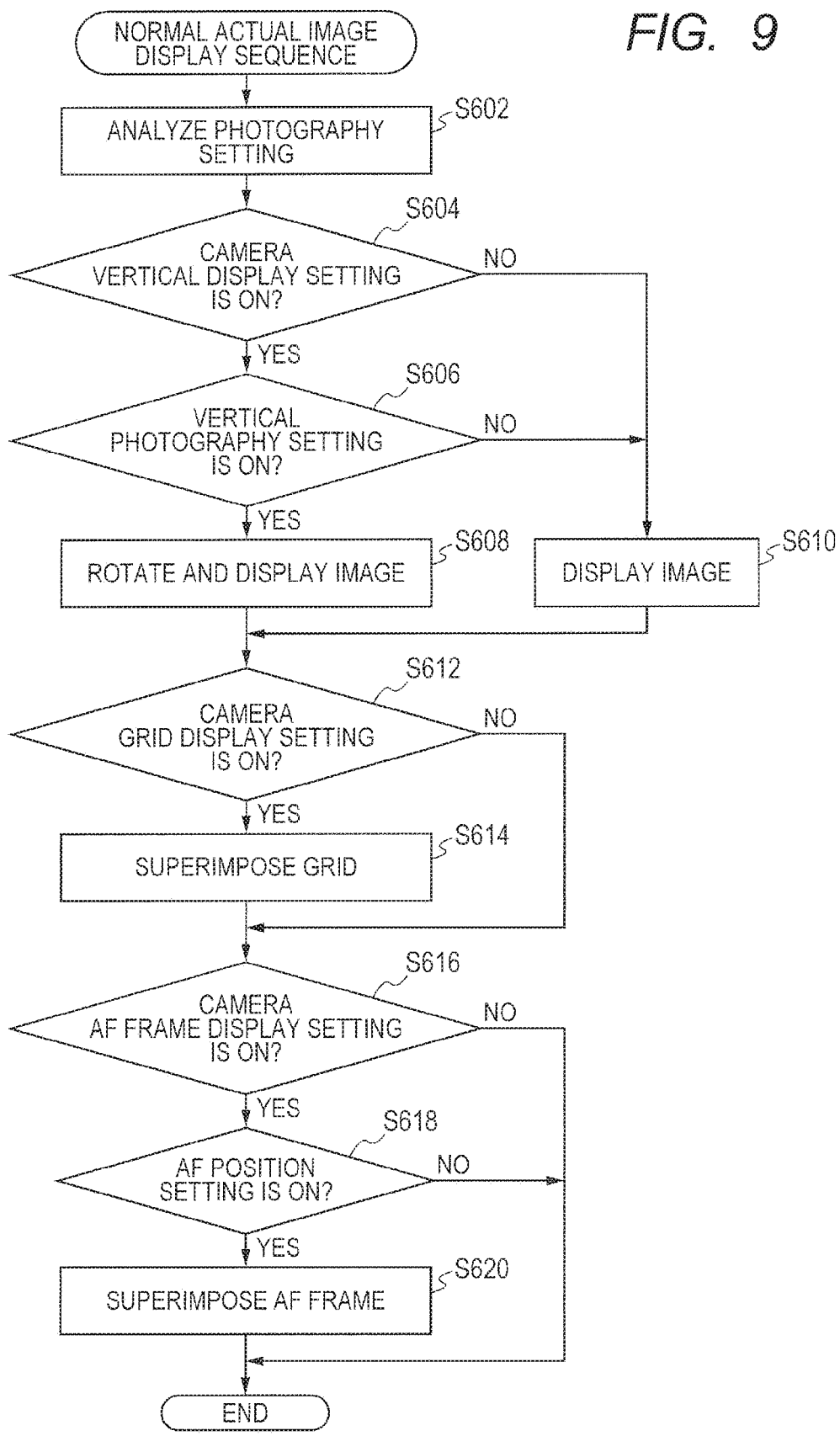
FIG. 9 is a flowchart for illustrating a display sequence of a normal actual image.

In Step S602 of FIG. 9, the system controller 223 analyzes the photography setting recorded in the image file read in Step S502 and a setting relating to the image pickup apparatus 1. The photography setting includes a vertical photography setting indicating the fact that the image has been taken by vertically positioning the image pickup apparatus 1, and an AF position setting indicating the AF position that was in focus during photography. The setting relating to the image pickup apparatus 1 includes a camera vertical display setting for allowing rotational display during display of the image on the image display unit 213. Further, the setting relating to the image pickup apparatus 1 includes a camera grid display setting for displaying a grid superimposed over the image displayed on the image display unit 213. In addition, the setting relating to the image pickup apparatus 1 includes a camera AF frame display setting for displaying an AF frame superimposed over the image displayed on the image display unit 213.

In Step S604, the system controller 223 determines whether or not the camera vertical display setting, which is used for rotating the image and displaying the rotated image on the image display unit 213 when the camera vertical display setting is ON, is ON. When the camera vertical display setting is ON (YES in Step S604), the system controller 223 advances the processing to Step S606. When the camera vertical display setting is OFF (NO in Step S604), the system controller 223 advances the processing to Step S610.

In Step S606, the system controller 223 determines whether or not the vertical photography setting of the image to be displayed is ON. When the vertical photography setting is ON (YES in Step S606), the system controller 223 advances the processing to Step S608. When the vertical photography setting is OFF (NO in Step S606), the system controller 223 advances the processing to Step S610.

Figure 11A:
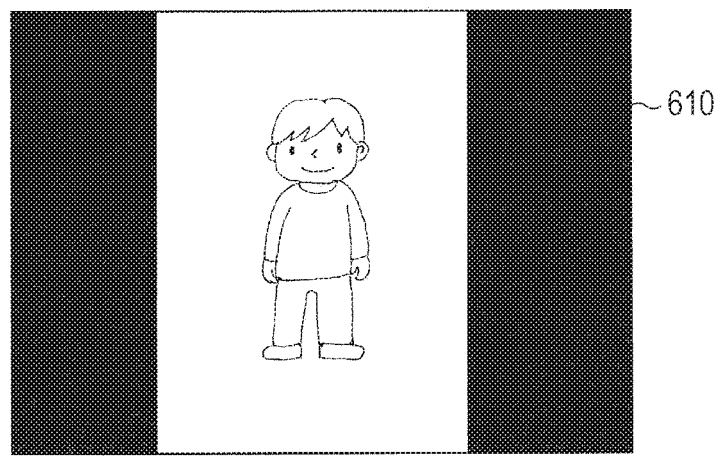
FIGS. 11A, 11B and 11C are diagrams for showing examples of display images in the normal photography mode.

In Step S608, the system controller 223 rotates the normal actual image read in Step S502 and displays the rotated normal actual image on the image display unit 213. Rotating and displaying the image results in a normal actual image such as a rotated image 610 shown in FIG. 11A being displayed. On the other hand, in Step S610, the system controller 223 displays the normal actual image read in Step S502 on the image display unit 213. In this case, the normal actual image 500 such as that shown in FIG. 10A is displayed.

In Step S612, the system controller 223 determines whether or not the camera grid display setting for displaying grid lines superimposed over the image is ON. When the camera grid display setting is ON (YES in Step S612), the system controller 223 advances the processing to Step S614. When the camera grid display setting is OFF (NO in Step S612), the system controller 223 advances the processing to Step S616.

Figure 11B:
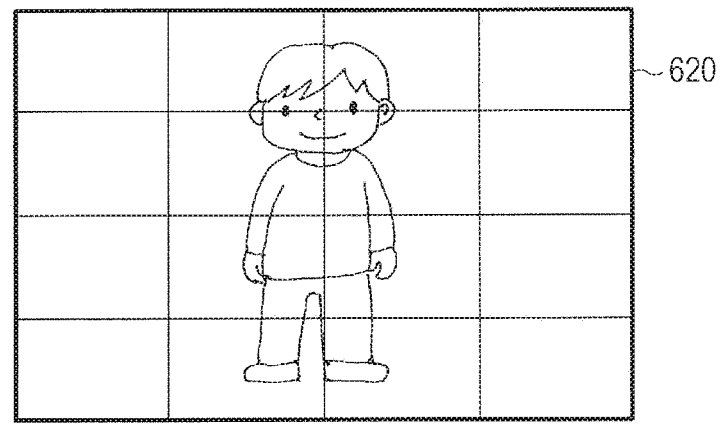

In Step S614, the system controller 223 displays the image on the image display unit 213 by superimposing a grid thereover. Displaying the grid results in a normal actual image 620 such as that shown in FIG. 11B being displayed. Note that, when the image is rotated in Step S608, the grid is superimposed and displayed on the image 610 shown in FIG. 11A.

In Step S616, the system controller 223 determines whether or not the camera AF frame display setting for superimposing an AF frame over the image is ON. When the camera AF frame display setting is ON (YES in Step S616), the system controller 223 advances the processing to Step S618. When the camera AF frame display setting is OFF (NO in Step S616), the system controller 223 finishes the display sequence of the normal actual image.

In Step S618, the system controller 223 determines whether or not the AF position setting of the image to be displayed is ON. When the AF position setting is ON (YES in Step S618), the system controller 223 advances the processing to Step S620. When the AF position setting is OFF (NO in Step S618), the system controller 223 finishes the display sequence of the normal actual image.

Figure 11C:
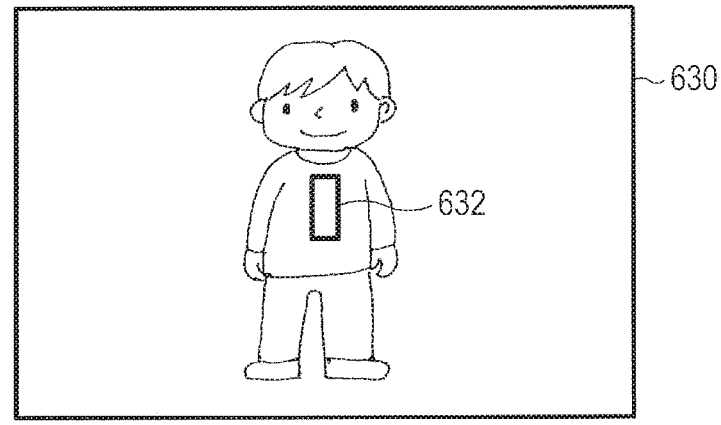

In Step S620, the system controller 223 displays the image on the image display unit 213 by superimposing an AF frame thereover. Displaying an AF frame 632 results in a normal actual image 630 such as that shown in FIG. 11C being displayed.

Returning to the description of FIG. 8, in Step S510, the system controller 223 determines whether or not an image switching request has been issued based on operation of the electronic dial switch 226 by the user. When an image switching request has been issued (YES in Step S510), the system controller 223 returns the processing to Step S502. When an image switching request has not been issued (NO in Step S510), the system controller 223 advances the processing to Step S512.

In Step S512, the system controller 223 determines whether or not a playback display timer has expired. When the timer has expired (YES in Step S512), the system controller 223 finishes the display sequence of the normal image. When the timer has not expired (NO in Step S512), the system controller 223 returns the processing to Step S510.

Thus, for display of the normal image, when an image switching request has been issued before the actual image is displayed, the processing is performed so that the switching of the display does not take much time by displaying a thumbnail image having a low display load and then proceeding to display of the next image. Further, the image is rotated and displayed by analyzing the photography setting recorded in the photographed image. In addition, a grid is displayed based on the camera grid display setting, which is a setting of the image pickup apparatus 1. Still further, an AF frame is displayed based on the camera AF frame display setting, which is a setting of the image pickup apparatus 1.

Referring back to FIG. 6, the display processing of the AF calibration image in Step S308 of FIG. 6 is described.

Figure 12:
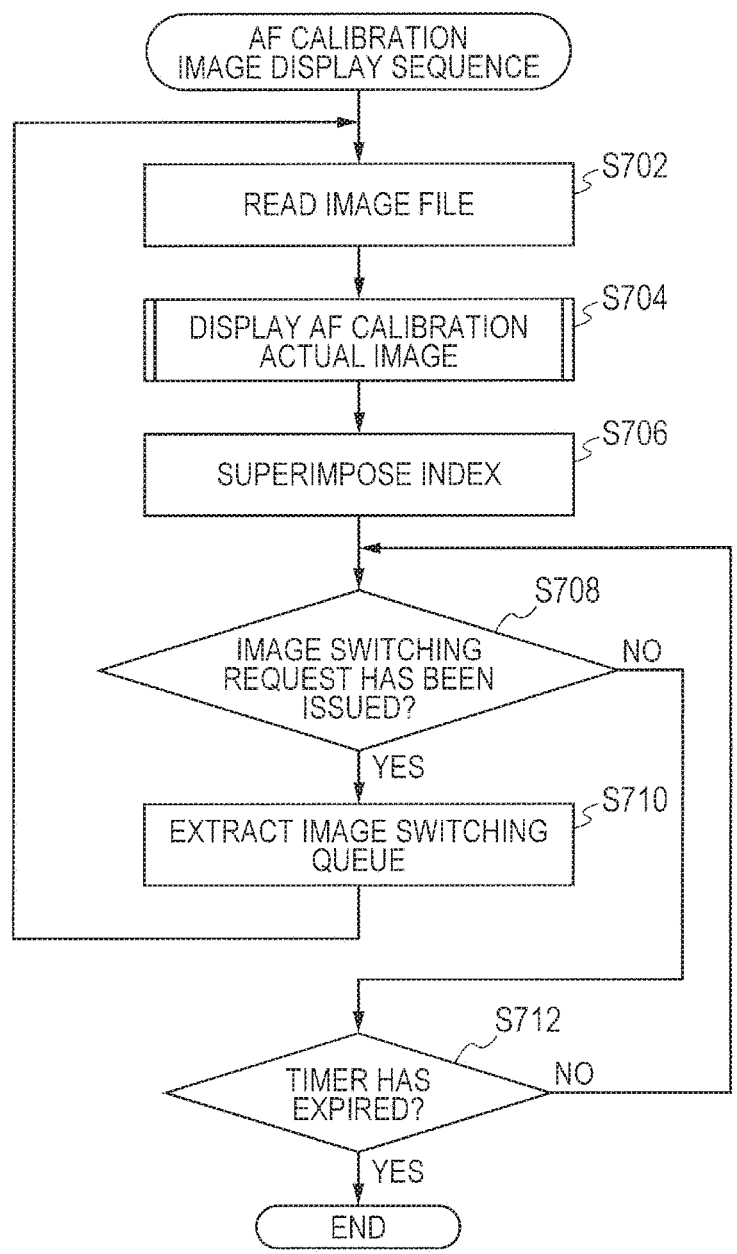
FIG. 12 is a flowchart for illustrating a display sequence of the AF calibration image.

FIG. 12 is a flowchart for illustrating display processing of the AF calibration image in the image pickup apparatus according to this embodiment. Each process in the flowchart is realized by the system controller 223 executing a program stored in the EEPROM 222.

In Step S702, the system controller 223 reads the image file relating to the image, which is stored in the image data recording medium 218 and was selected by rotation of the electronic dial switch 226 in Step S301. In Step S704, the system controller 223 calls a function for displaying the actual image photographed in the AF calibration mode, namely, an AF calibration actual image. In this case, the function for displaying the AF calibration actual image is described with reference to the flowchart illustrated in FIG. 13.

Figure 13:
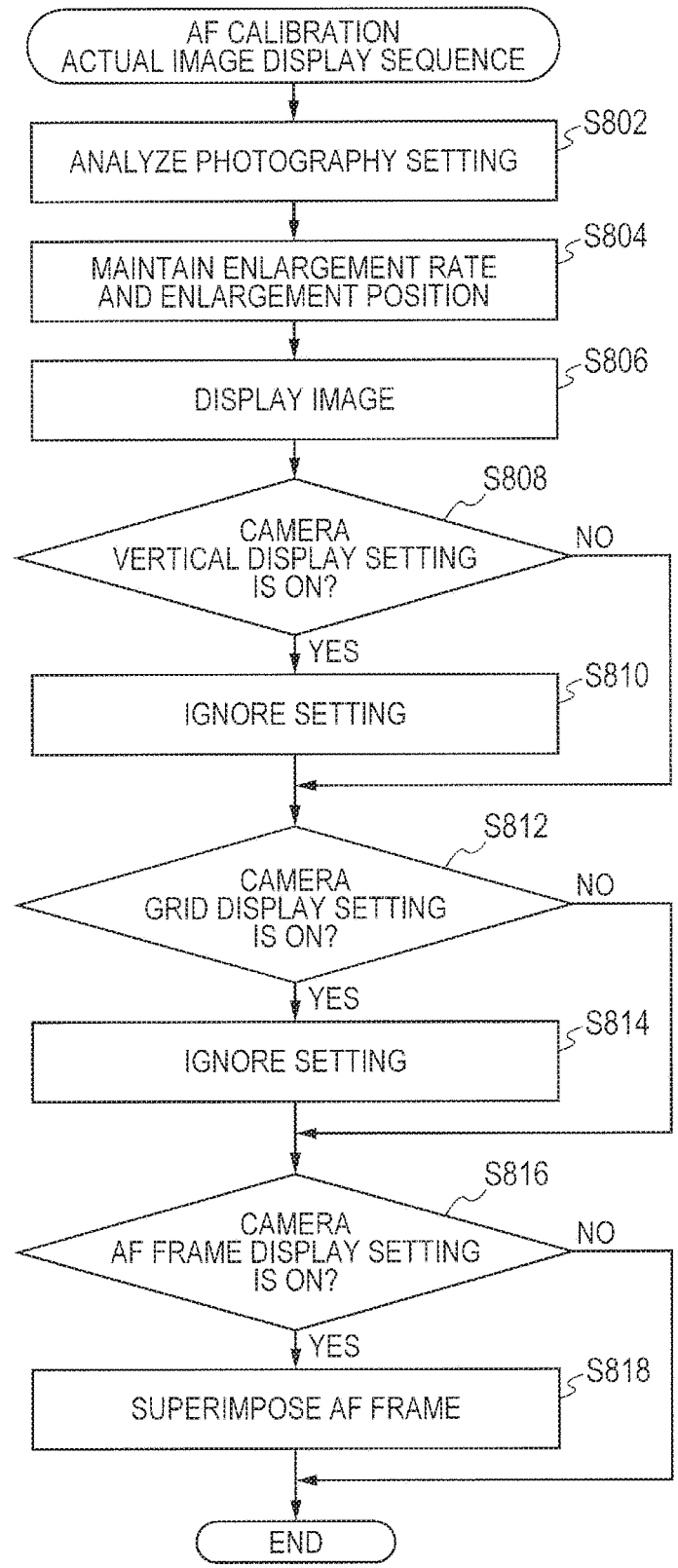
FIG. 13 is a flowchart for illustrating the display sequence of the AF calibration image.

In Step S802 of FIG. 13, the system controller 223 analyzes the photography setting recorded in the image file read in Step S702 and a setting relating to the image pickup apparatus 1. The photography setting includes a vertical photography setting indicating the fact that the camera was positioned vertically during photography, and an AF position setting indicating the AF position that was in focus during photography. The setting relating to the image pickup apparatus 1 includes a camera vertical display setting for allowing rotational display during display of the image on the image display unit 213. Further, the setting relating to the image pickup apparatus 1 includes a camera grid display setting for displaying a grid superimposed over the image displayed on the image display unit 213. In addition, the setting relating to the image pickup apparatus 1 includes a camera AF frame display setting for displaying an AF frame superimposed over the image displayed on the image display unit 213.

In Step S804, when a designation or an enlargement of an enlargement position is performed by using the electronic dial switch 226, the determination switch 227, or the enlarge/reduce switch 238, the system controller 223 stores the image to be displayed on the image display unit 213 in the DRAM 221 while maintaining the enlargement position and the enlargement rate. More specifically, when the enlargement position and the enlargement rate of the image photographed in the AF calibration mode have been designated, the system controller 223 designates and displays the enlargement position and the enlargement rate for the image to be displayed on the image display unit 213 (display unit).

In Step S806, the system controller 223 displays the image stored in the DRAM 221 in Step S804 on the image display unit 213. At this stage, an actual image such as the actual image 500 shown in FIG. 10A is displayed.

In Step S808, the system controller 223 determines whether or not the camera vertical display setting, which is used for rotating the image and displaying the rotated image on the image display unit 213, is ON. When the camera vertical display setting is ON (YES in Step S808), the system controller 223 advances the processing to Step S810. When the camera vertical display setting is OFF (NO in Step S808), the system controller 223 advances the processing to Step S812. In Step S810, the system controller 223 ignores the camera vertical display setting. As described above, for display of the normal image, when the camera vertical display setting is ON and a vertical photography setting is recorded in the image file, the image is rotated based on the vertical photography setting and displayed on the image display unit 213. However, for display of the AF calibration image, the camera vertical display setting is ignored. In other words, even when the vertical photography setting indicating that the image has been photographed by positioning the image pickup apparatus 1 vertically is recorded in the file of the image to be displayed on the image display unit 213 (display unit), the system controller 223 displays the image on the image display unit 213 without reflecting that vertical photography setting.

In Step S812, the system controller 223 determines whether or not the camera grid display setting for displaying grid lines superimposed over the image is ON. When the camera grid display setting is ON (YES in Step S812), the system controller 223 advances the processing to Step S814. When the camera grid display setting is OFF (NO in Step S812), the system controller 223 advances the processing to Step S816. In Step S814, the system controller 223 ignores the camera grid display setting. As described above, for display of the normal image, when the camera grid display setting is ON, the system controller 223 displays grid lines on the image display unit 213 superimposed over the image based on the camera grid display setting. However, for display of the AF calibration image, the camera grid display setting is ignored. In other words, even when the camera grid display setting is set as a setting of the image pickup apparatus 1, the system controller 223 displays the image on the image display unit 213 (display unit) without reflecting that camera grid display setting.

Figure 15:
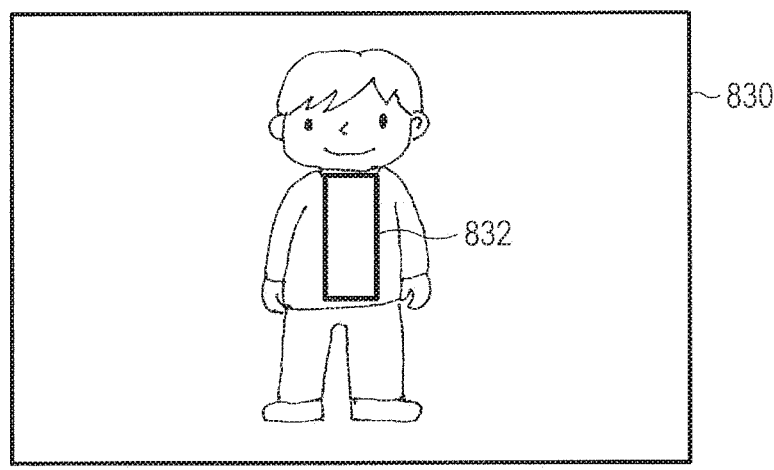
FIG. 15 is a diagram for showing an example of the display image in the AF calibration mode.

In Step S816, the system controller 223 determines whether or not the camera AF frame display setting for superimposing an AF frame over the image is ON. When the camera AF frame display setting is ON (YES in Step S816), the system controller 223 advances the processing to Step S818. When the camera AF frame display setting is OFF (NO in Step S816), the system controller 223 finishes the display sequence of the AF calibration image. In Step S818, the system controller 223 displays a larger AF frame than the AF frame that is displayed for the normal image. As described above, for display of the normal image, an AF frame is superimposed and displayed on the image display unit 213 based on the camera AF frame display setting. However, for display of the AF calibration image, a larger AF frame is displayed than the AF frame that is displayed for the normal image. As a result, as shown in FIG. 15, an actual image 830 having a large AF frame 832 superimposed thereover is displayed. In other words, when the camera AF frame display setting is set as a setting of the image pickup apparatus 1, the system controller 223 displays on the image display unit 213 (display unit) an image having a larger AF frame superimposed thereover than the AF frame that is displayed for the normal photography mode.

Figure 14:
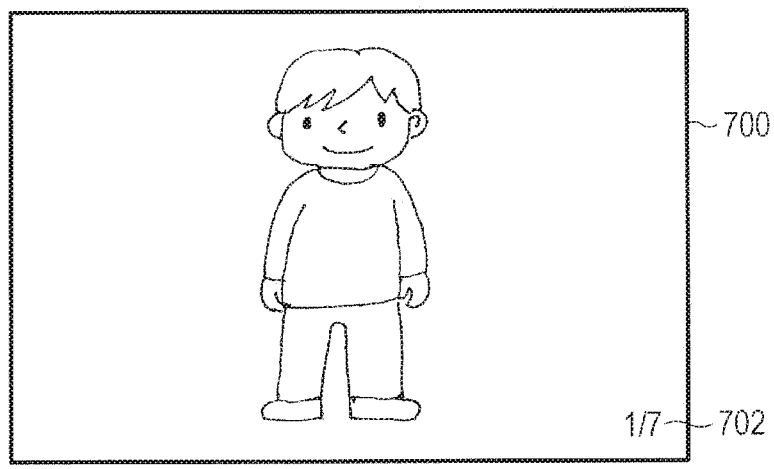
FIG. 14 is a diagram for showing an example of a display image in the AF calibration mode.

Returning to the description of FIG. 12, in Step S706, the system controller 223 superimposes and displays an index number indicating a photography order of bracketing photography on the image display unit 213. At this stage, an actual image 700 such as the index image shown in FIG. 14 is displayed, and an index number 702 is superimposed and displayed on the actual image.

In Step S708, the system controller 223 determines whether or not an image switching request has been issued based on operation of the electronic dial switch 226 by the user. When an image switching request has been issued, the system controller 223 adds one image switching queue per one request, and stores the added image switching queue(s) in the DRAM 221. When there are one or more image switching queues stored in the DRAM 221 (YES in Step S708), the system controller 223 advances the processing to Step S710. When there are no image switching queues stored in the DRAM 221 (NO in Step S708), the system controller 223 advances the processing to Step S712.

In this case, there is no limit on the number of image switching queues that are stored. However, a limit of one may be set for the number of image switching queues, and image switching requests other than the image switching request being executed may be discarded. Further, the number of image switching queues may be set to be the same as the number of images photographed in bracketing photography.

In Step S710, the system controller 223 extracts one image switching queue from the DRAM 221, updates the image switching queues in the DRAM 221, and returns the processing to Step S702. In Step S712, the system controller 223 determines whether or not a playback display timer has expired. When the timer has expired (YES in Step S712), the system controller 223 finishes the display sequence of the AF calibration image. When the timer has not expired (NO in Step S712), the system controller 223 returns the processing to Step S708.

Thus, in this embodiment, when displaying the AF calibration image, unlike when displaying the normal image, the next actual image is displayed without displaying a thumbnail image even when an image switching request is issued before the actual image is displayed. Further, in this embodiment, the camera vertical position display setting and the camera grid display setting, which are settings of the image pickup apparatus 1, are ignored. In addition, in this embodiment, the camera AF frame that is displayed when displaying the AF calibration image is larger than the camera AF frame that is displayed when displaying the normal image. Still further, in this embodiment, when displaying the AF calibration image, the AF calibration actual image is displayed by superimposing an index number indicating the photography order of bracketing photography.

The original purpose of AF calibration is to facilitate confirmation of the focus. In contrast, for normal image display, which is an image display method activated in the playback mode for playback and display of an image photographed in the normal photography mode, confirmation of the focus is difficult for the following reasons.

1: Although the time taken for image switching is shortened due to a thumbnail being displayed when there is an image switching request, the actual image that should be displayed in order to confirm the focus is not displayed.

2: In the case of a vertical position display, the image is displayed in a comparatively small size when performing the vertical position display in order to perform an operation for matching the photography direction with the rotation of the camera.

3: For a camera grid display, the grid lines lie over the image because the grid lines are displayed based on a setting of the image pickup apparatus 1.

4: For a camera AF frame display, the AF frame overlaps the image because the AF frame is displayed based on a setting of the image pickup apparatus 1.

However, for display of the AF calibration image, which is an image display method that is activated in the AF calibration mode according to this embodiment, the focus can be easily confirmed even in such situations.

Thus, the image pickup apparatus 1 according to this embodiment has a plurality of playback modes, including a playback mode for displaying images photographed in a normal photography mode and a playback mode for displaying images photographed in an AF calibration mode. In other words, the image pickup apparatus 1 includes an AF correction mode for calculating an AF correction value for the purpose of correcting a focus position of a photographing lens based on an image selected from among a plurality of images, and a normal photography mode for performing photography while adjusting the focus of the photographing lens based on the AF correction value.

Switching the image playback mode depending on whether the photography mode is the normal photography mode or the AF calibration mode facilitates confirmation of the focus that is desired for a mode in which the image photographed in the AF calibration mode is displayed (AF calibration image display). In other words, in the normal photography mode, when the system controller 223 (control unit) of the image pickup apparatus 1 receives a switching request for a plurality of images photographed in the normal photography mode, in a first mode, the system controller 223 displays the switched images relating to the normal photography mode on the image display unit 213 of the image pickup apparatus 1. Further, in the AF correction mode, when the system controller 223 (control unit) receives a switching request for a plurality of images photographed in the AF correction mode, in a second mode different from the first mode, the system controller 223 displays the switched images relating to the AF correction mode on the display unit.

Second Embodiment

An image pickup apparatus according to a second embodiment of the present invention is described with reference to the drawings. The image pickup apparatus according to this embodiment is capable of handling a case in which, in an operation when displaying the actual image relating to the AF calibration mode, an image switching request is issued before the actual image is displayed and the timer expires. Note that, the configuration of an image pickup apparatus 1 according to this embodiment is the same as the configuration of the image pickup apparatus 1 according to the first embodiment, and hence a description thereof is omitted here.

Figure 16:
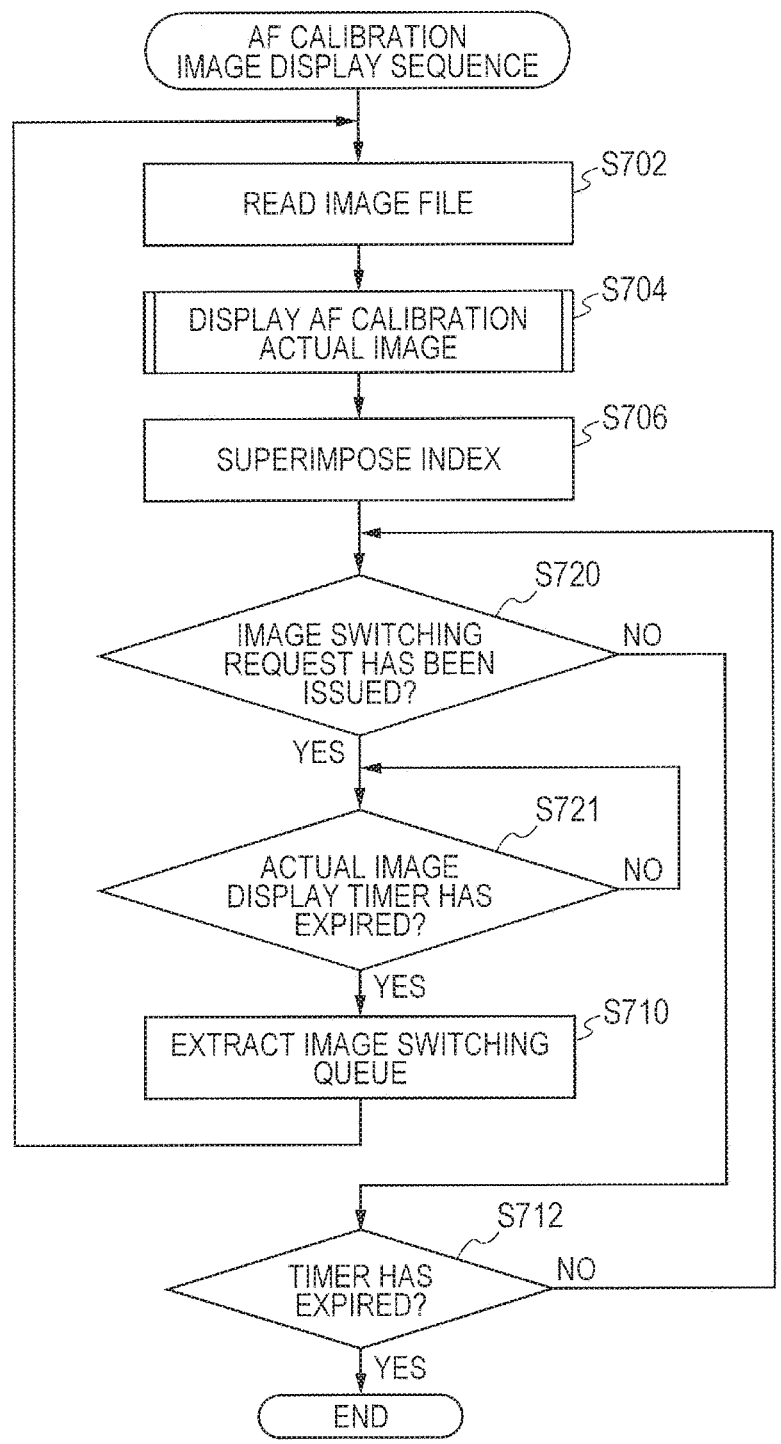
FIG. 16 is a flowchart for illustrating a display sequence of the AF calibration image in an image pickup apparatus according to a second embodiment of the present invention.

FIG. 16 is a flowchart for illustrating display processing of the AF calibration image according to this embodiment. Each process in the flowchart illustrated in FIG. 16 is realized by the system controller 223 executing a program stored in the EEPROM 222. In this case, processing that is the same as in the first embodiment is denoted using the same reference symbols in FIG. 12, and a description thereof is omitted here.

In Step S720, the system controller 223 determines whether or not an image switching request has been issued based on operation of the electronic dial switch 226 by the user. When an image switching request has been issued, the system controller 223 adds one image switching queue per one request, and stores the added image switching queue(s) in the DRAM 221. When there are one or more image switching queues stored in the DRAM 221 (YES in Step S720), the system controller 223 advances the processing to Step S721. When there are no image switching queues stored in the DRAM 221 (NO in Step S720), the system controller 223 advances the processing to Step S712.

In Step S721, the system controller 223 determines whether or not the display timer of the actual image displayed on the image display unit 213 in the display sequence of the AF calibration actual image in Step S704 has expired. Note that, the display timer starts when the actual image is displayed in Step S806 of FIG. 13, and expires after a predetermined duration (e.g., 1 second) has elapsed. When the timer has expired (YES in Step S721), the system controller 223 advances the processing to Step S710. When the timer has not expired (NO in Step S721), the system controller 223 repeats the processing of Step S721.

Thus, in this embodiment, for display of the AF calibration image, when an image switching request is issued before the actual image is displayed and the timer has expired, the next actual image is not displayed until the timer has expired, that is, the actual image is displayed for a fixed duration.

Thus, similarly to the image pickup apparatus 1 according to the first embodiment, with the playback mode (AF calibration image display) for displaying an image photographed in the AF calibration mode, the image pickup apparatus 1 according to this embodiment mode can facilitate confirmation of the desired focus. In addition, displaying the actual image for a fixed duration can prevent the displayed image from being switched without confirmation of the focus.

Third Embodiment

An image pickup apparatus according to a third embodiment of the present invention is described with reference to FIG. 17. The image pickup apparatus according to this embodiment is capable of handling a case in which, in an operation when displaying the actual image relating to the AF calibration mode, an image switching request is issued before the actual image is displayed. Note that, the configuration of an image pickup apparatus 1 according to this embodiment is the same as the configuration of the image pickup apparatus 1 according to the first embodiment, and hence a description thereof is omitted here.

Figure 17:
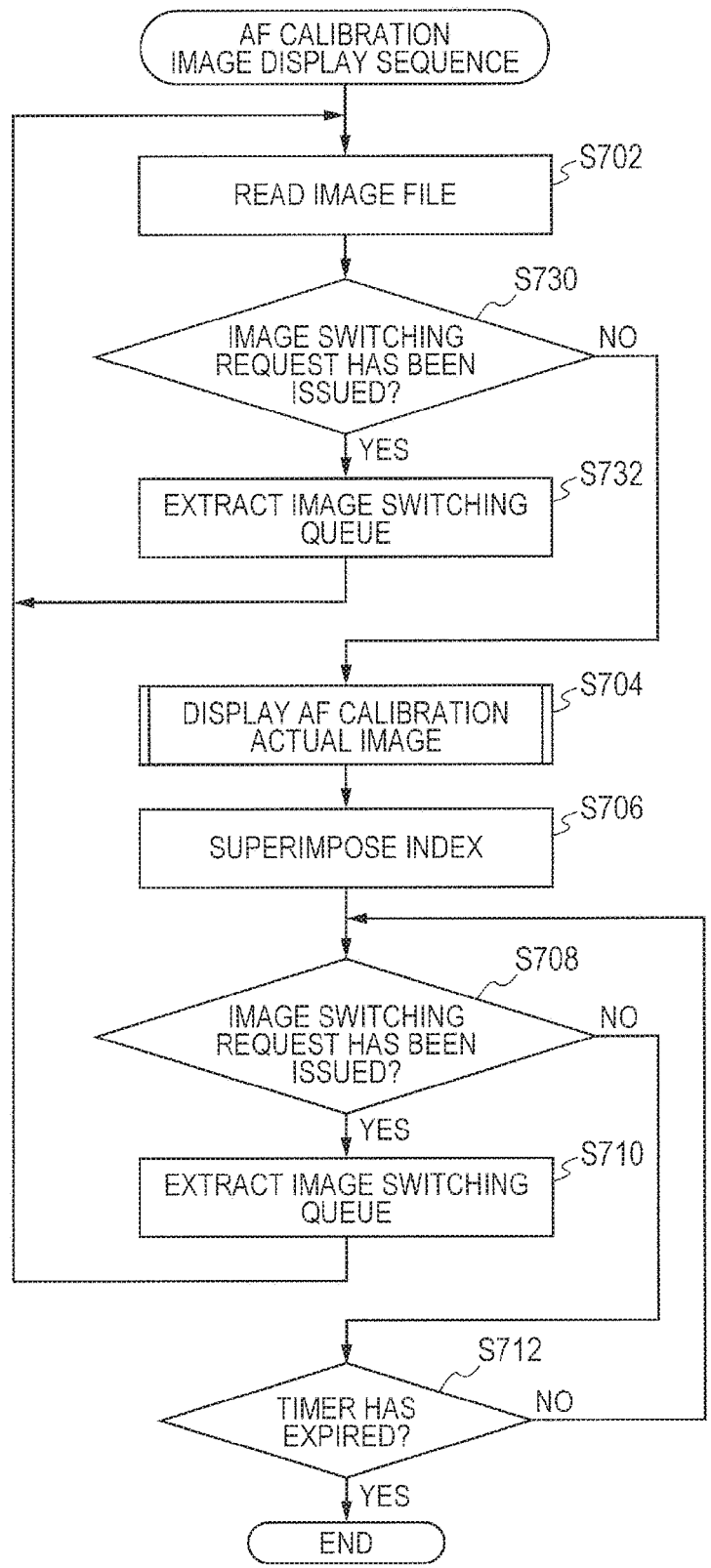
FIG. 17 is a flowchart for illustrating a display sequence of the AF calibration image in an image pickup apparatus according to a third embodiment of the present invention.

FIG. 17 is a flowchart for illustrating display processing of the AF calibration image according to this embodiment. Each process in the flowchart illustrated in FIG. 17 is realized by the system controller 223 executing a program stored in the EEPROM 222. In this case, processing that is the same as in the first embodiment is denoted using the same reference symbols in FIG. 12, and a description thereof is omitted here.

In Step S730, the system controller 223 determines whether or not an image switching request has been issued based on operation of the electronic dial switch 226 by the user. When an image switching request has been issued, the system controller 223 adds one image switching queue per one request, and stores the added image switching queue(s) in the DRAM 221. When there are one or more image switching queues stored in the DRAM 221 (YES in Step S730), the system controller 223 advances the processing to Step S732. When there are no image switching queues stored in the DRAM 221 (NO in Step S730), the system controller 223 advances the processing to Step S704.

In Step S732, the system controller 223 extracts one image switching queue from the DRAM 221, and updates the image switching queues in the DRAM 221. Thus, in this embodiment, for display of the AF calibration image, when an image switching request is issued before the actual image is displayed, the system controller 223 reads the next image file and then advances the processing to Step S704 to Step S712.

Thus, similarly to the image pickup apparatus 1 according to the first embodiment, with the playback mode for displaying an image photographed in the AF calibration mode, the image pickup apparatus 1 according to this embodiment mode can facilitate confirmation of the desired focus. In addition, the image pickup apparatus 1 according to this embodiment enables the actual image display to be switched based on the image switching request by the user.

Fourth Embodiment

An image pickup apparatus according to a fourth embodiment of the present invention is described with reference to the drawings. The image pickup apparatus according to this embodiment is capable of handling a case in which, in an operation when displaying the actual image relating to the AF calibration mode, the AF correction value is beyond an adjustment range. Note that, the configuration of an image pickup apparatus 1 according to this embodiment is the same as the configuration of the image pickup apparatus 1 according to the first embodiment, and hence a description thereof is omitted here.

Figure 18:
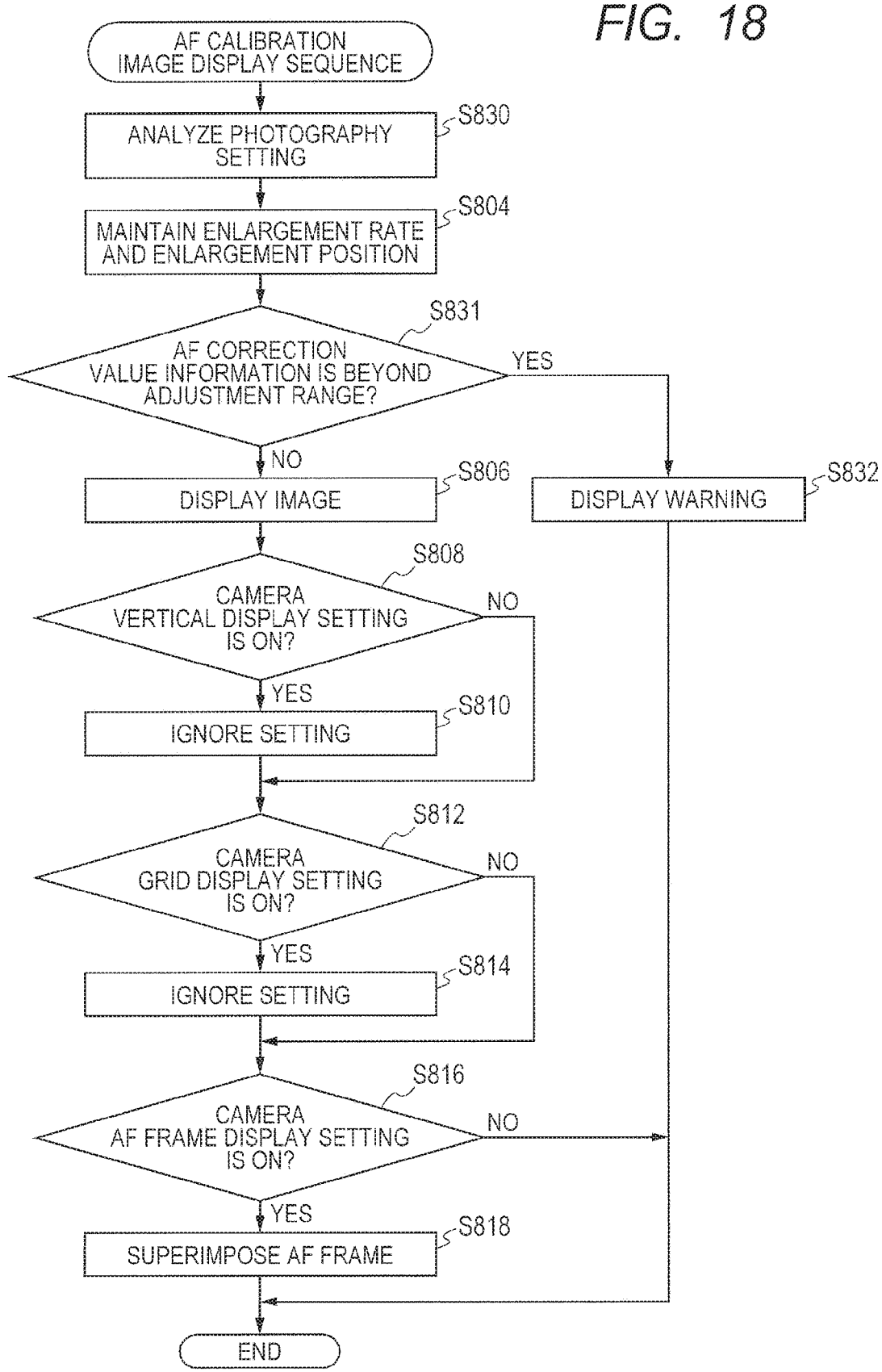
FIG. 18 is a flowchart for illustrating a display sequence of the AF calibration image in an image pickup apparatus according to a fourth embodiment of the present invention.

FIG. 18 is a flowchart for illustrating display processing of the AF calibration image according to this embodiment. Each process in the flowchart illustrated in FIG. 18 is realized by the system controller 223 executing a program stored in the EEPROM 222. In this case, processing that is the same as in the display processing of the AF calibration image according to the first embodiment (FIG. 13) is denoted using the same reference symbols, and a description thereof is omitted here. Note that, the processing for displaying the AF calibration image according to this embodiment (FIG. 18) may be applied to the processing of Step S704 in any of FIG. 12, FIG. 16, FIG. 17, and FIG. 19.

In Step S830, the system controller 223 analyzes the photography setting recorded in the image file read in Step S702 and a setting relating to the image pickup apparatus 1. The photography setting includes, in addition to the setting information included in the photography setting described above in the first embodiment, AF correction value information.

In Step S831, the system controller 223 determines whether or not the AF correction value information is beyond an adjustment range. When the AF correction value information is beyond the adjustment range (YES in Step S831), the system controller 223 advances the processing to Step S832. When the AF correction value information is not beyond the adjustment range (NO in Step S831), the system controller 223 advances the processing to Step S806. In Step S832, the system controller 223 displays a warning on the image display unit 213 that the AF correction value information is beyond the adjustment range, and then finishes the flowchart of the display processing of the AF calibration image.

Thus, for display of the AF calibration image, when the AF correction value of the actual image to be displayed is beyond the adjustment range, AF correction cannot be correctly performed even if the user selects that actual image. Therefore, a warning is displayed without displaying the actual image having an AF correction value beyond the adjustment range.

Thus, similarly to the image pickup apparatus 1 according to the first embodiment, with the playback mode for displaying an image photographed in the AF calibration mode, the image pickup apparatus 1 according to this embodiment mode can facilitate confirmation of the desired focus. In addition, the image pickup apparatus 1 according to this embodiment is capable of preventing a task from being performed that is of little benefit to the user by, regarding an image for which AF correction cannot be correctly performed, issuing a warning instead of displaying the image.

Note that, in this embodiment, when the AF correction value information of the actual image to be displayed is beyond the adjustment range, a warning is displayed. However, in order to prevent a task from being performed that is of little benefit to the user, the image pickup apparatus 1 may be configured so that the image is not displayed, and the image displayed immediately before remains being displayed.

Fifth Embodiment

An image pickup apparatus according to a fifth embodiment of the present invention is described with reference to the drawings. An image pickup apparatus 1 according to this embodiment is capable of handling a case in which, in an operation when displaying the actual image relating to the AF calibration mode, an image having the AF correction value beyond an adjustment range is included. Note that, the configuration of the image pickup apparatus 1 according to this embodiment is the same as the configuration of the image pickup apparatus 1 according to the first embodiment, and hence a description thereof is omitted here.

Figure 19:
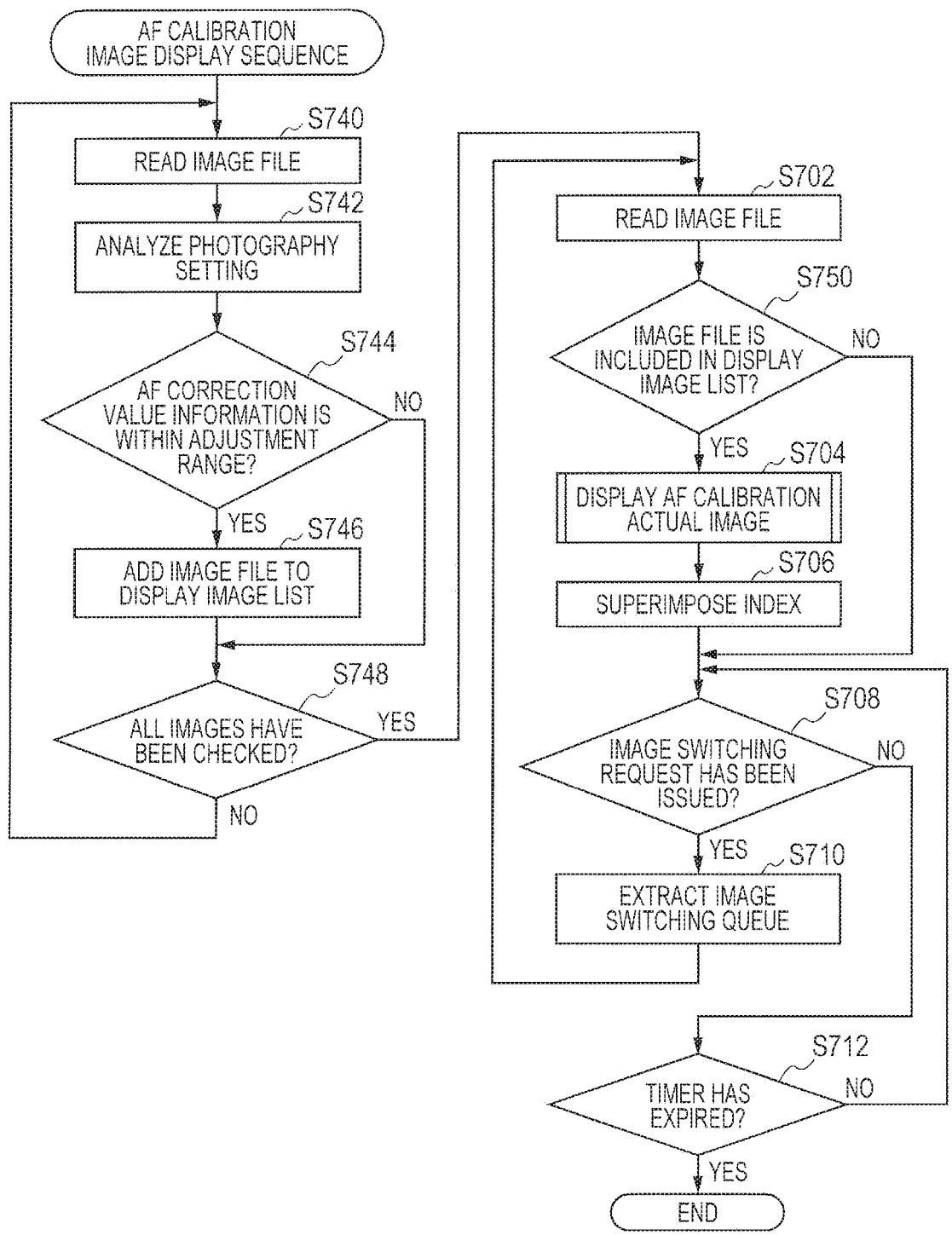
FIG. 19 is a flowchart for illustrating a display sequence of the AF calibration image in an image pickup apparatus according to a fifth embodiment of the present invention.

FIG. 19 is a flowchart for illustrating display processing of the AF calibration image according to this embodiment. Each process in the flowchart illustrated in FIG. 19 is realized by the system controller 223 executing a program stored in the EEPROM 222. In this case, processing that is the same as in the display processing of the AF calibration image according to the first embodiment (FIG. 12) is denoted using the same reference symbols, and a description thereof is omitted here.

In Step S740, the system controller 223 reads an image file stored in the image data recording medium 218. In Step S742, the system controller 223 analyzes the photography setting recorded in the image file read in Step S740. The photography setting includes, in addition to the setting information included in the photography setting described above in the first embodiment, AF correction value information.

In Step S744, the system controller 223 determines whether or not the AF correction value information is within an adjustment range. When the AF correction value information is within the adjustment range (YES in Step S744), the system controller 223 advances the processing to Step S746. When the AF correction value information is not within the adjustment range (NO in Step S744), the system controller 223 advances the processing to Step S748.

In Step S746, the system controller 223 adds the image file to a display image list as an image to be displayed in the display of the AF calibration image. In Step S748, the system controller 223 determines whether or not all image files, the number of which is equal to the number of images in bracketing photography, have been checked in the AF calibration photography sequence. When all image files, the number of which is equal to the number of images in bracketing photography, have been checked (YES in Step S748), the system controller 223 advances the processing to Step S702. When not all image files, the number of which is equal to the number of images in bracketing photography, have been checked (NO in Step S748), the system controller 223 returns the processing to Step S740.

In Step S750, the system controller 223 determines whether or not the image file read in Step S702 is included in the display image list recorded in Step S746. When the image file is included in the display image list (YES in Step S750), the system controller 223 advances the processing to Step S704. When the image file is not included in the display image list (NO in Step S750), the system controller 223 advances the processing to Step S708.

Thus, in this embodiment, for display of the AF calibration image, when the AF correction value information of the actual image to be displayed is beyond the adjustment range, that actual image is excluded in advance from the actual images to be displayed because AF correction cannot be correctly performed even if the user selects that image.

Thus, similarly to the image pickup apparatus 1 according to the first embodiment, with the playback mode for displaying an image photographed in the AF calibration mode, the image pickup apparatus 1 according to this embodiment mode can facilitate confirmation of the desired focus. In addition, with the image pickup apparatus 1 according to this embodiment, a task that is of little benefit to the user can be prevented from being performed by, regarding an image for which AF correction cannot be correctly performed, excluding in advance the image from the images to be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-017372, filed Jan. 30, 2015, which is hereby incorporated by reference herein in its entirety.

What is claimed is:

1. An image pickup apparatus, comprising:
a storage unit configured to store an adjustment value for adjusting a position at which a photographing lens stops during an automatic focusing operation performed with respect to an object, the adjustment value being selected by a user; and
a control unit,
the control unit comprising:
a first mode for controlling so that when an image switching request has been received, before a switched image is displayed on a display unit, a thumbnail image corresponding to the switched image is displayed on the display unit; and
a second mode for controlling so that when the image switching request has been received, the switched image is displayed on the display unit without displaying the thumbnail image,
the control unit being configured to, in an operation state for selecting the adjustment value, control in the second mode so that the switched image is displayed on the display unit without the thumbnail image being displayed.

2. An image pickup apparatus according to claim 1, wherein in the operation state for selecting the adjustment value, one image among a plurality of images is selectable by the user.

3. An image pickup apparatus according to claim 2, wherein the storage unit is configured to store the adjustment value corresponding to the selected one image.

4. An image pickup apparatus according to claim 1, wherein the control unit is configured to control so that in the second mode, an index number for the switched image is displayed on the display unit.

5. An image pickup apparatus according to claim 1, wherein the control unit is configured to control so that, even when the switched image is an image photographed by positioning the image pickup apparatus vertically, in the second mode, the switched image is displayed on the display unit without being rotated.

6. An image pickup apparatus according to claim 1, wherein the control unit is configured to control so that, even when a setting for displaying a grid is set, in the second mode, the switched image without the grid is displayed on the display unit.

7. An image pickup apparatus according to claim 1, wherein the control unit is configured to control so that, when a setting for displaying an AF frame is set, in the second mode, an AF frame larger than an AF frame used when displaying the switched image in the first mode is displayed on the display unit together with the switched image.

8. An image pickup apparatus according to claim 1, wherein the control unit is configured to control so that, when an enlargement position and an enlargement rate are designated for the switched image, in the second mode, the switched image is displayed on the display unit by applying the enlargement position and the enlargement rate on the switched image.

9. An image pickup apparatus according to claim 1, wherein the control unit is configured to control so that, in the second mode, the switched image is displayed on the display unit for a predetermined time.

10. An image pickup apparatus according to claim 1, wherein the control unit is configured to control so that, when a request to switch the image is received in the second mode, display of an image being displayed on the display unit is stopped and the switched image is displayed on the display unit.

11. An image pickup apparatus according to claim 1, wherein the control unit is configured to control so that a warning is displayed on the display unit when the adjustment value is beyond a predetermined range.

12. An image pickup apparatus according to claim 1, wherein the control unit is configured to control so that, when the adjustment value is beyond a predetermined range, the switched image having the adjustment value beyond the predetermined range is not displayed on the display unit.

13. An image pickup apparatus according to claim 1, wherein the control unit is configured to control so that the adjustment value is calculated for each of a plurality of the images, and only an image having the adjustment value within the predetermined range is displayed on the display unit as the switched image.

14. An image pickup apparatus according to claim 1, wherein the control unit is configured to control so that a plurality of the images are photographed by changing a focus position deviation amount to perform bracketing photography.

* * * * *